US011035692B2

(12) United States Patent
Ahmed et al.

(10) Patent No.: US 11,035,692 B2
(45) Date of Patent: Jun. 15, 2021

(54) TECHNOLOGIES FOR PEDOMETRIC SENSING IN FOOTWEAR

(71) Applicant: Intel Corporation, Santa Clara, CA (US)

(72) Inventors: Mohsin Y. Ahmed, Beaverton, OR (US); Suraj Sindia, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 797 days.

(21) Appl. No.: 15/187,113

(22) Filed: Jun. 20, 2016

(65) Prior Publication Data
US 2017/0363440 A1 Dec. 21, 2017

(51) Int. Cl.
*G01C 22/00* (2006.01)
*A43B 3/00* (2006.01)
*G01P 15/18* (2013.01)

(52) U.S. Cl.
CPC .......... *G01C 22/006* (2013.01); *A43B 3/0005* (2013.01); *G01P 15/18* (2013.01)

(58) Field of Classification Search
CPC ..... G01C 22/006; A43B 3/0005; G01P 15/18; A61B 5/6807; A63B 2220/40
See application file for complete search history.

(56) References Cited

U.S. PATENT DOCUMENTS

| | | | | |
|---|---|---|---|---|
| 2012/0158407 A1* | 6/2012 | Forsell | ................. | A61B 5/0028 704/275 |
| 2013/0006583 A1* | 1/2013 | Weast | ................... | A61B 5/112 702/189 |
| 2016/0097788 A1* | 4/2016 | Looze | .................... | G01P 13/02 702/141 |

OTHER PUBLICATIONS

K. A. Cook-Chennault, N. Thambi, A. M. Sastry, "Powering MEMS portable devices—a review of non-regenerative and regenerative power supply systems with special emphasis on piezoelectric energy harvesting systems," Smart Material Structures, vol. 17, 2008. pp. 1-33. downloaded on Aug. 16, 2016 from http://deepblue.lib.umich.edu/bitstream/handle/2027.42/64168/sms8_4_043001.pdf?sequence=1.

(Continued)

*Primary Examiner* — Roy Y Yi
*Assistant Examiner* — Geoffrey T Evans
(74) *Attorney, Agent, or Firm* — Alliance IP, LLC

(57) ABSTRACT

Technologies for pedometric sensing in footwear include a step tracker compute device. The step tracker compute device is to receive acceleration data indicative of movement of a foot of a user, generate energy contour data indicative of energy levels over time, based on the received acceleration data, determine dynamic energy thresholds indicative of peaks in the energy contour data, and detect steps of the user based on the dynamic energy thresholds and the energy contour data to generate step data. Other embodiments are described and claimed.

25 Claims, 12 Drawing Sheets

(56) References Cited

OTHER PUBLICATIONS

"Forget Clip-On Trackers and Wristbands: This Smart Shoe Insole Will Track Your Physical Activity", downloaded Aug. 16, 2016 from http://www.fastcompany.com/3029051/world-changing-ideas/forget-clip-on-trackers-and-wristbands-this-smart-shoe-insole-will-trac.

"Pedestrian tracking with shoe-mounted inertial sensors", downloaded Aug. 16, 2016 from ieeexplore.ieee.org/xpls/abs_all.jsp?arnumber=1528431&tag=1.

"How do I improve the accuracy of my Nike+ running sensor?", downloaded Aug. 16, 2016 from https://support-en-us.nikeplus.com/app/answers/detail/a_id/20927/p/3169,3179.

"Human Anatomy Fundamentals: Additional Tips", downloaded Aug. 16, 2016 from http://design.tutsplus.com/tutorials/human-anatomy-fundamentals-additional-tips—cms-22125\.

"Intel Shows Its Sporty Side at CES, but Can it Really Outrun the Competition?", downloaded Aug. 16, 2016 from http://www.recode.net/2016/1/5/11588506/intel-shows-its-sporty-side-at-ces-but-can-it-really-outrun-the.

* cited by examiner

TECHNOLOGIES FOR PEDOMETRIC SENSING IN FOOTWEAR

BACKGROUND

It is suggested that every person walk ten thousand steps every day for healthy living and maintaining proper body weight. To assist people in tracking their footsteps, commercial pedometers have been introduced to the marketplace. Generally, these pedometers are worn on the waist and use magnetic pendulums to sense the wearer's feet impacting the ground and/or the movement of the wearer's hips. These forces cause the magnetic pendulums to open and close an electrical circuit to register the wearer's steps. However, such devices are prone to false positives on events when the wearer shakes his body or moves his feet while sitting. Additionally, some pedometers require a calibration process in order to identify an ideal position on the wearer's body to detect footsteps and to differentiate a signal associated with a footstep from other occurrences.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
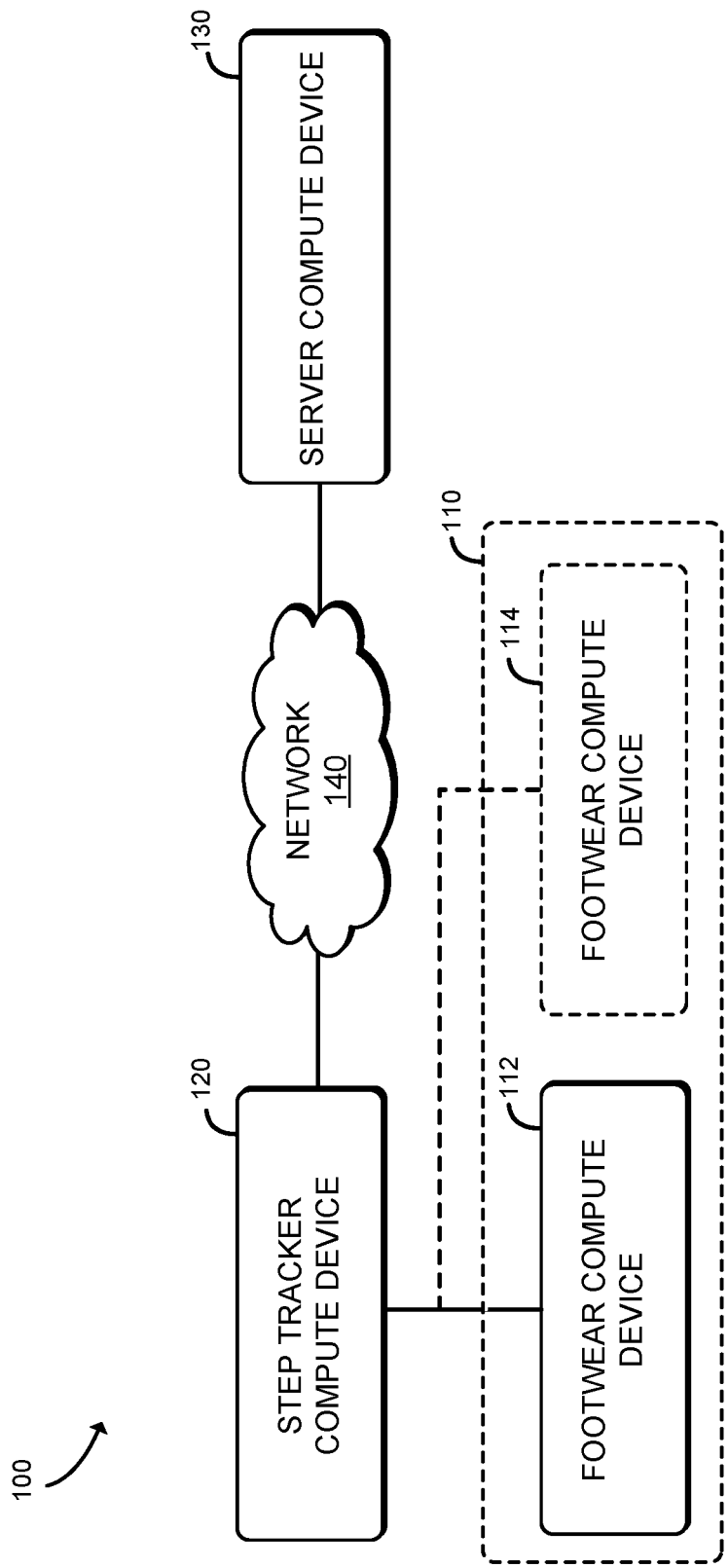
FIG. 1 is a simplified block diagram of at least one embodiment of a system for tracking footsteps of a user.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for tracking footsteps of a user includes a set of footwear compute devices 110 in communication with a step tracker compute device 120, which is in communication with a server compute device 130 through a network 140. In the illustrative embodiment, the set of footwear compute devices 110 includes a footwear compute device 112 incorporated into footwear (e.g., a shoe) of a user and another footwear compute device 114 incorporated into the footwear (e.g., the other shoe) of the user. In operation, the illustrative footwear compute device 110 senses acceleration of the user's foot in three dimensions and provides acceleration data to the step tracker compute device 120. Further, in the illustrative embodiment, the footwear compute device 110 includes a power conversion device to obtain power in one form, such as from impacts of the shoe against the ground or from sunlight, and provides the power in a second form (e.g., electricity) to the components of the footwear compute device 110. In the illustrative embodiment, the step tracker compute device 120, in operation, analyzes the acceleration data to dynamically determine energy thresholds that are indicative of steps of the user as the user's pace and gait change in response to changing environments. By dynamically determining the energy thresholds, the step tracker compute device 120 removes the need for the user of the step tracker compute device 120 to perform a calibration process with the step tracker compute device 120 before walking. Additionally, in the illustrative embodiment, the step tracker compute device 120, in operation, transmits data indicative of the detected steps to the server compute device 130 for storage and/or analysis.

Figure 2:
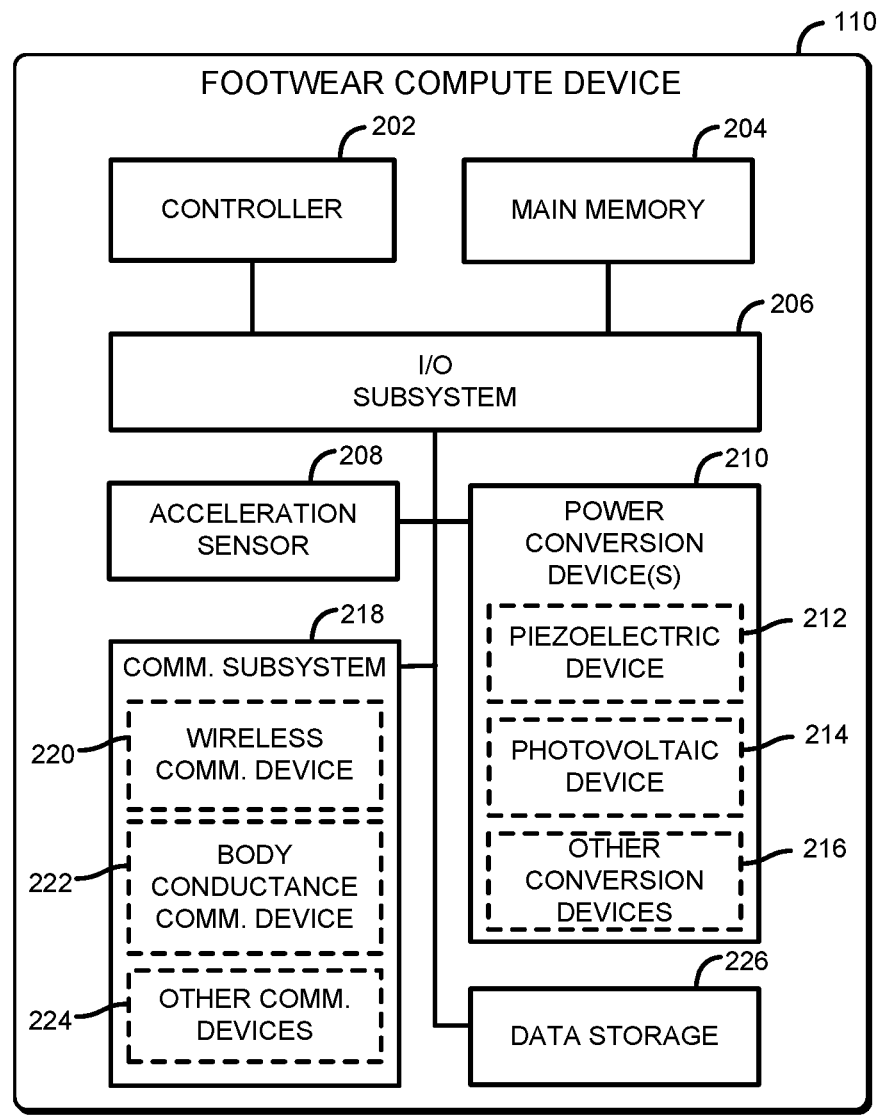
FIG. 2 is a simplified block diagram of at least one embodiment of a footwear compute device of the system of FIG. 1.

Referring now to FIG. 2, each footwear compute device 110 may be embodied as any type of compute device capable of performing the functions described herein. In the illustrative embodiment, the footwear compute device 110 is incorporated into an article of footwear, such as a shoe, boot, or sandal. The footwear compute device 110 may be distributed across different portions of the footwear, including portions of the sole, sides, or top of the footwear. As shown in FIG. 2, the illustrative footwear compute device 110 includes a controller 202, a main memory 204, an input/output subsystem 206, an acceleration sensor 208, one or more power conversion devices 210, and a communication subsystem 218. Of course, the footwear compute device 110 may include other or additional components, such as those commonly found in a computer (e.g., data storage, etc.), in other embodiments. Additionally, in some embodiments, one or more of the illustrative components may be incorporated in, or otherwise from a portion of, another component. For example, the memory 204, or portions thereof, may be incorporated in the controller 202 in some embodiments.

The controller 202 may be embodied as any type of processing device capable of performing the functions described herein. For example, the controller may be embodied as a microcontroller, single or multi-core processor(s) having one or more processor cores, a digital signal processor, or other processor or processing/controlling circuit. Similarly, the main memory 204 may be embodied as any type of volatile or non-volatile memory or data storage capable of performing the functions described herein. In operation, the main memory 204 may store various data and software used during operation of the footwear compute device 110 such as acceleration data from the acceleration sensor 208, operating systems, applications, programs, libraries, and drivers. The main memory 204 is communicatively coupled to the controller 202 via the I/O subsystem 206. Of course, in other embodiments (e.g., those in which the controller 202 includes a memory controller), the main memory 204 may be directly communicatively coupled to the controller 202.

The I/O subsystem 206 may be embodied as circuitry and/or components to facilitate input/output operations with the controller 202, the main memory 204, and other components of the footwear compute device 110. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 206 may form a portion of a system-on-a-chip (SoC) and be incorporated, along with the controller 202, the memory 204, and other components of the footwear compute device 110, on a single integrated circuit chip.

The acceleration sensor 208 may be embodied as any type of device capable of detecting and measuring acceleration, such as a micro electro-mechanical system (MEMS) including one or more cantilever beams and proof masses, one or more capacitive accelerometers, one or more piezoelectric accelerometers, or other devices. In the illustrative embodiment, the acceleration sensor 208 is capable of detecting and measuring acceleration in three spatial dimensions. The acceleration sensor 208 may be configured to provide acceleration data indicative of sensed acceleration in three dimensions to the controller 202 in a digital format or an analog format (e.g., a voltage level associated with each dimension) on a continual basis (i.e., at a repeating time interval).

The one or more power conversion devices 210 may be embodied as any devices capable of obtaining power in one form and converting the power to another form, for use by the footwear compute device 110. As such, the power conversion devices 210 may include a piezoelectric device 212, a photovoltaic device 214 (i.e., one or more solar cells), or other power conversion devices 216 capable of performing the functions described herein. The piezoelectric device 212 is any device capable of utilizing the piezoelectric effect to generate an electric charge in response to applied mechanical stress. As such, the piezoelectric device 212 may include any one or more materials, such as naturally occurring crystals (e.g., quartz) or synthetic materials (e.g., langasite) to produce an electric charge in response to mechanical stress. As described in more detail herein, the piezoelectric device 212 may be incorporated into a sole of a shoe or other article of footwear to convert the mechanical stress of a user's foot impacting the ground to electricity for use by the footwear compute device 110. The photovoltaic device 214 may be embodied as any device capable of utilizing the photoelectric effect to produce electrical energy in response to receiving photons (i.e., light). As such, the photovoltaic device 214 may include one or more solar cells. As referenced above, the power conversion devices 210 may include other power conversion devices 216 capable of converting power from one form, such as body heat, movement, or other forms of power to another form (e.g., electricity) for use by the footwear compute device 110.

The illustrative footwear compute device 110 also includes the communication subsystem 218, which may be embodied as one or more devices and/or circuitry capable of enabling communications with one or more compute devices, such as the step tracker compute device 120, another footwear compute device 110, or the server compute device 130. The communication subsystem 218 may be configured to use any suitable communication protocol to communicate with other devices including, for example, wireless data communication protocols, cellular communication protocols, and/or wired communication protocols.

The communication subsystem 218 may include a wireless communication device 220, a body conductance communication device 222, and/or other communication devices 224. The wireless communication device 220 may be any device capable of communicating data (e.g., acceleration data) to another compute device (e.g., the step tracker compute device 120) wirelessly. As such, the wireless communication device 220 may transmit data using any wireless data communication protocol, such as Bluetooth, ZigBee, or other wireless communication protocols. The body conductance communication device 222 may be embodied as any device capable of communicating data to another compute device (e.g., the step tracker compute device 120) that is in contact with the body of the user, using body conductance (e.g., electrical conductance of the skin of the user). The other communication devices 224 may be embodied as any other types of communication devices capable of communicating data (e.g., acceleration data) to another compute device (e.g., the step tracker compute device 120).

The footwear compute device 110 may additionally include a data storage device 226, which may be embodied as any type of device or devices configured for short-term or long-term storage of data such as, for example, memory devices and circuits, memory cards, solid-state drives, hard disk drives, or other data storage devices. The data storage device 226 may store data and software used during operation of the footwear compute device 110 such as acceleration data, operating systems, applications, programs, libraries, and drivers, as described in more detail herein.

Figure 3:
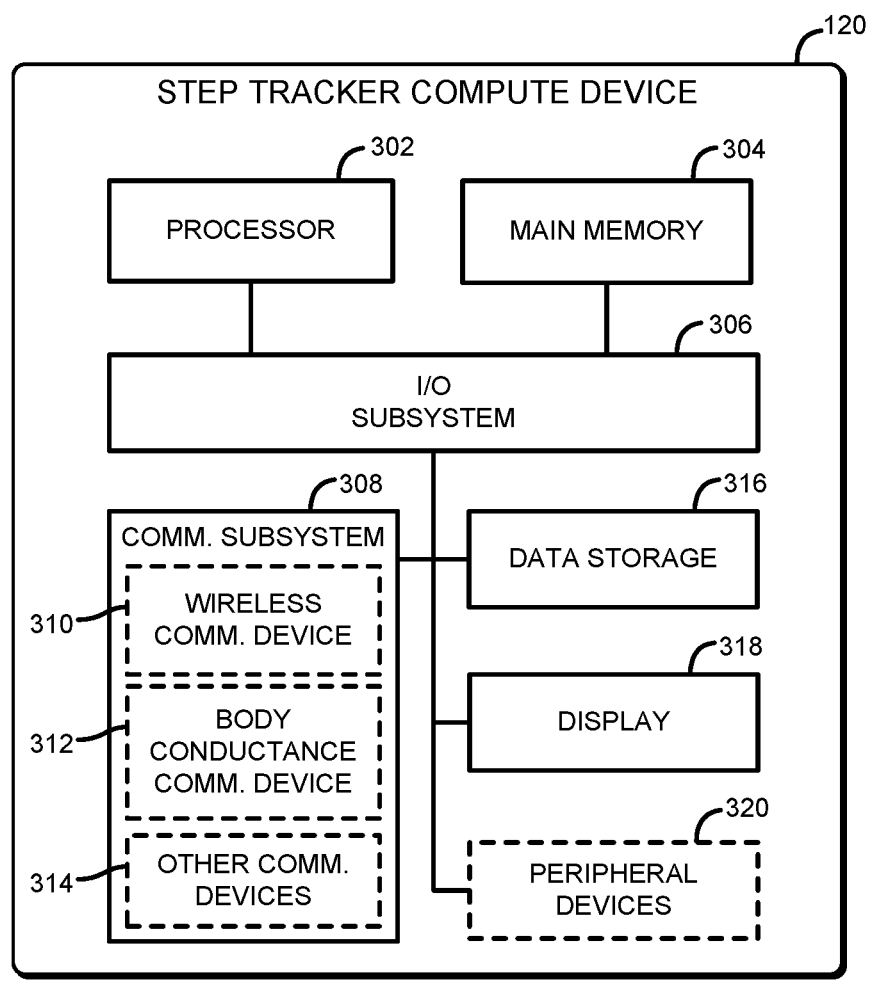
FIG. 3 is a simplified block diagram of at least one embodiment of a step tracker compute device of the system of FIG. 1.

Referring now to FIG. 3, the step tracker compute device 120 may be embodied as any type of compute device capable of performing the functions described herein. For example, the step tracker compute device 120 may be embodied as a computer, wearable compute device, a smartphone, a personal digital assistant, a consumer electronic device, a tablet compute device, a smart appliance, and/or any other compute device capable of analyzing the acceleration data from the footwear compute device(s) 110 to produce step data indicative of steps taken by the user. In the illustrative embodiment, the step tracker compute device 120 includes a processor 302, a main memory 304, an input/output subsystem 306, a communication subsystem 308, and a data storage 316.

The processor 302 may be embodied as any type of processor capable of performing the functions described herein. For example, the processor may be embodied as a single or multi-core processor(s) having one or more processor cores, a digital signal processor, a microcontroller, or other processor or processing/controlling circuit. Similarly, the main memory 304 may be embodied as any type of volatile or non-volatile memory or data storage capable of performing the functions described herein. In operation, the main memory 304 may store various data and software used during operation of the step tracker compute device 120 such as acceleration data, energy contour data, step data, operating systems, applications, programs, libraries, and drivers. The main memory 304 is communicatively coupled to the processor 302 via the I/O subsystem 306.

The I/O subsystem 306 may be embodied as circuitry and/or components to facilitate input/output operations with the processor 302, the main memory 304, and other components of the step tracker compute device 120. For example, the I/O subsystem 306 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 306 may form a portion of a system-on-a-chip (SoC) and be incorporated, along with the processor 302, the memory 304, and other components of the step tracker compute device 120, on a single integrated circuit chip.

The illustrative step tracker compute device 120 also includes the communication subsystem 308, which may be embodied as one or more devices and/or circuitry capable of enabling communications with one or more compute devices, such as the footwear compute device(s) 110 or the server compute device 130. The communication subsystem 308 may be configured to use any suitable communication protocol to communicate with other devices including, for example, wireless data communication protocols, cellular communication protocols, and/or wired communication protocols. The communication subsystem 308 may include a wireless communication device 310, a body conductance communication device 312, and/or other communication devices 314. The wireless communication device 310 may be any device capable of communicating data with one or more compute devices such as the footwear compute device(s) 110 and/or the server compute device 130 wirelessly. As such, the wireless communication device 310 may transmit data using any wireless data communication protocol. The body conductance communication device 312 may be embodied as any device capable of communicating data with another compute device (e.g., the footwear compute device(s) 110) that are in contact with the body of the user, using body conductance (e.g., electrical conductance of the skin of the user). The other communication devices 314 may be embodied as any other types of communication devices capable of communicating data (e.g., acceleration data or step data) with another compute device (e.g., the footwear compute device(s) 110 and/or the server compute device 130).

The data storage device 316 may be embodied as any type of device or devices configured for short-term or long-term storage of data such as, for example, memory devices and circuits, memory cards, solid-state drives, hard disk drives, or other data storage devices. The data storage device 316 may store data and software used during operation of the step tracker compute device 120 such as acceleration data, energy contour data, step data, operating systems, applications, programs, libraries, and drivers, as described in more detail herein.

The step tracker compute device 120 additionally includes a display 318. The display may be embodied as, or otherwise use, any suitable display technology including, for example, a liquid crystal display (LCD), a light emitting diode (LED) display, a cathode ray tube (CRT) display, a plasma display, and/or other display usable in a compute device. The display 318 may include a touchscreen sensor that uses any suitable touchscreen input technology to detect the user's tactile selection of information displayed on the display including, but not limited to, resistive touchscreen sensors, capacitive touchscreen sensors, surface acoustic wave (SAW) touchscreen sensors, infrared touchscreen sensors, optical imaging touchscreen sensors, acoustic touchscreen sensors, and/or other type of touchscreen sensors. The step tracker compute device 120 may additionally include one or more peripheral devices 320. Such peripheral devices 320 may include any type of peripheral device commonly found in a compute device such as speakers, a mouse, a keyboard, and/or other input/output devices, interface devices, and/or other peripheral devices.

Referring back to FIG. 1, the server compute device 130 may be embodied as any type of server computer capable of storing and analyzing step data (i.e., determining statistical information, detecting trends, tracking progress towards goals, etc.) from the step tracker compute device 120 and potentially other step tracker compute devices of other users. The server compute device 130 may include components commonly found in a server computer, such as a processor, memory, I/O subsystem, data storage, communication subsystem, etc. Those components may be substantially similar to the corresponding components of the step tracker compute device 120. As such, further descriptions of the like components are not repeated herein with the understanding that the description of the corresponding components provided above in regard to the step tracker compute device 120 applies equally to the corresponding components of the server compute device 130.

Referring back to FIG. 1, the network 140 may be embodied as any number of various wireless or wired networks. For example, the network 140 may be embodied as, or otherwise include, a publicly-accessible, global network such as the Internet, a cellular network, a wireless or wired wide area network (WAN), or a wireless or wired local area network (LAN). As such, the network 140 may include any number of additional devices, such as additional computers, routers, and switches, to facilitate communications among the devices of the system.

Figure 4:
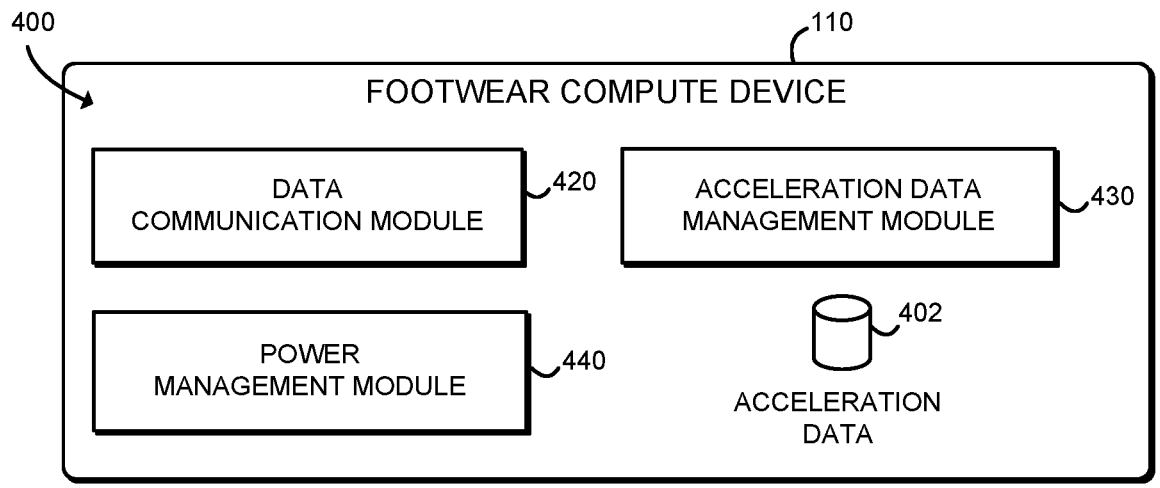
FIG. 4 is a simplified block diagram of at least one embodiment of an environment that may be established by a footwear compute device of FIGS. 1 and 2.

Referring now to FIG. 4, in the illustrative embodiment, the footwear compute device 110 may establish an environment 400 during operation. The illustrative environment 400 includes a data communication module 420, an acceleration data management module 430, and a power management module 440. Each of the modules, logic, and other components of the environment 400 may be embodied as hardware, firmware, software, or a combination thereof. As such, in some embodiments, one or more of the modules of the environment 400 may be embodied as circuitry or collection of electrical devices (e.g., data communication circuitry 420, acceleration data management circuitry 430, power management circuitry 440, etc.). It should be appreciated that, in such embodiments, one or more of the data communication circuitry 420, the acceleration data management circuitry 430, and the power management circuitry 440 may form a portion of one or more of the controller 202, acceleration sensor 208, power conversion device(s) 210, communication subsystem 218, data storage 226, and/or other components of the footwear compute device 110. Additionally, in some embodiments, one or more of the illustrative modules may form a portion of another module and/or one or more of the illustrative modules may be independent of one another. Further, in some embodiments, one or more of the modules of the environment 400 may be embodied as virtualized hardware components or emulated architecture, which may be established and maintained by the controller 202 or other components of the footwear compute device 110.

In the illustrative environment 400, the footwear compute device 110 also includes acceleration data 402 produced using the acceleration sensor 208. In the illustrative embodiment, the acceleration data 402 indicates acceleration of the footwear compute device 110 in three spatial dimensions over time. The acceleration data 402 may be accessed by the various modules and/or sub-modules of the footwear compute device 110. It should be appreciated that the footwear compute device 110 may include other components, sub-components, modules, sub-modules, and/or devices commonly found in a compute device, which are not illustrated in FIG. 4 for clarity of the description.

The data communication module 420, which may be embodied as hardware, firmware, software, virtualized hardware, emulated architecture, and/or a combination thereof as discussed above, is configured to manage inbound and outbound data communications to and from the footwear compute device 110, respectively. For example, the data communication module 420 may be configured to transmit the acceleration data 402 to the step tracker compute device 120. The data communication module 420 may be configured to pair with the step tracker compute device 120 prior to communicating acceleration data to the step tracker compute device 120. In some embodiments, the data communication module 420 may additionally be configured to pair with another footwear compute device 110, to receive acceleration data from that footwear compute device 110 and relay the received acceleration data to the step tracker compute device 120. In the illustrative embodiment, the data communication module 420 is configured to transmit the acceleration data 402 to the step tracker compute device 120 at a predefined interval (e.g., every tenth of a second). Additionally or alternatively, the data communication module 420 may be configured to transmit the acceleration data 402 in response to a query from the step tracker compute device 120.

The acceleration data management module 430, which may be embodied as hardware, firmware, software, virtualized hardware, emulated architecture, and/or a combination thereof as discussed above, is configured to interface with the acceleration sensor 208 to receive the acceleration data 402. In some embodiments, the acceleration data management module 430 may be configured to buffer the received acceleration data 402 until the data communication module 420 transmits the acceleration data 402 to the step tracker compute device 120. Additionally, the acceleration data management module 430 may be configured to convert data received from the acceleration sensor from one format to another format, such as by converting analog signals (e.g., voltage levels) into digital data, and/or otherwise parse or condition the acceleration data 402 for storage and/or transmission to the step tracker compute device 120.

The power management module 440, which may be embodied as hardware, firmware, software, virtualized hardware, emulated architecture, and/or a combination thereof as discussed above, is configured to receive power from the one or more power conversion devices 210 and provide the power to the components of the footwear compute device on an as-needed basis. Further, the power management module 440 may be configured to determine a present level of power provided by the power conversion device(s) 210, estimate predicted levels of power to be provided by the power conversion device(s) 210, selectively enable or disable one or more of the power conversion devices 210, and control power consumption modes (e.g., a high power operational mode, a low power operational mode, a sleep mode, etc.) of various components of the footwear compute device (e.g., the controller 202, the main memory 204, etc.).

Figure 5:
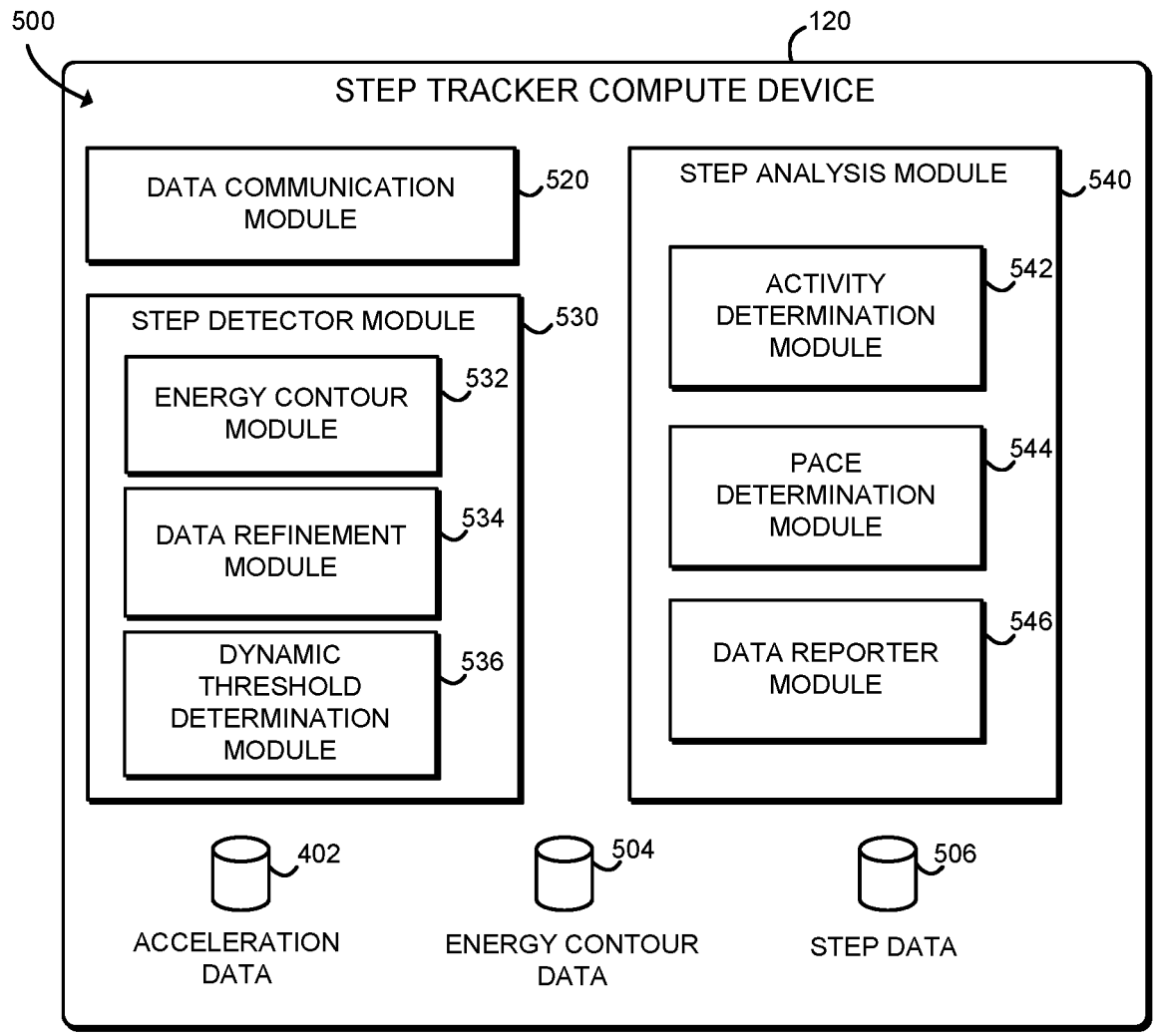
FIG. 5 is a simplified block diagram of at least one embodiment of an environment that may be established by a step tracker compute device of FIGS. 1 and 3.

Referring now to FIG. 5, in the illustrative embodiment, the step tracker compute device 120 may establish an environment 500 during operation. The illustrative environment 500 includes a data communication module 520, a step detector module 530, and a step analysis module 540. Each of the modules, logic, and other components of the environment 500 may be embodied as hardware, firmware, software, or a combination thereof. As such, in some embodiments, one or more of the modules of the environment 500 may be embodied as circuitry or collection of electrical devices (e.g., data communication circuitry 520, step detector circuitry 530, step analysis circuitry 540, etc.). It should be appreciated that, in such embodiments, one or more of the data communication circuitry 520, the step detector circuitry 530, and the step analysis circuitry 540 may form a portion of one or more of the processor 302, main memory 304, communication subsystem 308, data storage 316, and/or other components of the step tracker compute device 120. Additionally, in some embodiments, one or more of the illustrative modules may form a portion of another module and/or one or more of the illustrative modules may be independent of one another. Further, in some embodiments, one or more of the modules of the environment 500 may be embodied as virtualized hardware components or emulated architecture, which may be established and maintained by the processor 302 or other components of the step tracker compute device 120.

In the illustrative environment 500, the step tracker compute device 120 also includes the acceleration data 402 received from the footwear compute device(s) 110, energy contour data 504, and step data 506. As described above, in the illustrative embodiment, the acceleration data 402 indicates acceleration of the footwear compute device 110 in three spatial dimensions over time. The energy contour data 504, in the illustrative embodiment, is indicative of an amount of energy associated with the acceleration data 402 over time. As described in more detail herein, in the illustrative embodiment, the energy contour data 504 is the result of a conversion performed by the step tracker compute device 120 of the multiple dimensions of the acceleration data 402 over time into a single value (e.g., energy) that varies over time. In the illustrative embodiment, the step data 506 is representative of steps detected by the step tracker compute device 120 based on analyzing the energy contour data 504, which in turn is produced from the acceleration data 402, as described in more detail herein. The step data 506 is any data that indicates steps taken by the user in a particular time period (e.g., during a day, over a week, month, year, or episodically, such as during a walk). The step data 506 may also include information indicative of a pace, characteristics of a stride of the user, a determined condition or activity of the user, and/or statistical information pertaining to the detected steps of the user. The acceleration data 402, energy contour data 504, and step data 506 may be accessed by the various modules and/or sub-modules of the step tracker compute device 120. It should be appreciated that the step tracker compute device 120 may include other components, sub-components, modules, sub-modules, and/or devices commonly found in a compute device, which are not illustrated in FIG. 5 for clarity of the description.

The data communication module 520, which may be embodied as hardware, firmware, software, virtualized hardware, emulated architecture, and/or a combination thereof as discussed above, is configured to manage inbound and outbound data communications to and from the step tracker compute device 120, respectively. For example, the data communication module 520 may be configured to receive the acceleration data 402 from each footwear compute device 110 and transmit the step data 506 to the server compute device 130. The data communication module 520 may be configured to pair with each footwear compute device 110 prior to receiving acceleration data. Additionally, in the illustrative embodiment, the data communication module 520 is configured to communicate the step data 506 to the server compute device 130 for storage and/or analysis (e.g., statistical analysis, goal tracking, etc.).

The illustrative step detector module 530, which may be embodied as hardware, firmware, software, virtualized hardware, emulated architecture, and/or a combination thereof as discussed above, is configured to analyze the acceleration data 402 received from the footwear compute device(s) 110 and detect the user's steps from the acceleration data 402. To do so, in the illustrative embodiment, the step detector module 530 includes an energy contour module 532, a data refinement module 534, and a dynamic threshold determination module 536. The energy contour module 532, in the illustrative embodiment, is configured to receive the acceleration data 402 as an input and produce the energy contour data 504 as an output. As described above, the acceleration data 402 indicates acceleration in three spatial dimensions over time. The energy contour module 532 may be configured to determine the energy for each instance in time represented in the acceleration data 402 by squaring the acceleration for each spatial dimension and summing the resulting values. As such, the definition of "energy" as used in at least some embodiments described herein may differ from conventional definitions of energy. In the illustrative embodiment, the energy contour module 532 is further configured to compensate for an effect of gravity when calculating the energy contour data 504, such as by subtracting the acceleration of gravity (i.e., 9.8 meters per second squared) from acceleration data in a dimension that is affected by gravity (i.e., is parallel to gravity, such as the z dimension).

In the illustrative embodiment, the data refinement module 534 is configured to remove noise and otherwise prepare the energy contour data 504 for detection of steps. In doing so, the data refinement module 534 is configured to apply a filter, such as a bandpass filter, to remove data associated with frequencies that are not related to a pace at which a human generally walks or runs. In the illustrative embodiment, the data refinement module 534 is configured to apply a bandpass filter that excludes frequencies less than 0.5 Hz and greater than 2 Hz. The data refinement module 534 may also be configured to mask negative values in the filtered energy contour data, such as by setting any negative values to zero.

The illustrative dynamic threshold determination module 536 is configured to continually determine a threshold indicative of peaks in the energy contour data 504. As the user's pace and gait may change during the course of walking over differing terrain, the peaks in the energy contour data may occur at differing energy values. As described in more detail herein, the dynamic threshold determination module 536 may be configured to perform a sliding window analysis in which the dynamic threshold determination module 536 determines a threshold energy value for any given point in time represented by the energy contour data, based on a set (a "window") of consecutive energy values preceding and/or succeeding the given point in time. An energy value in the energy contour data 504 that satisfies the dynamic threshold associated with the instant in time associated with that energy value qualifies as a peak.

It should be appreciated that each of the energy contour module 532, the data refinement module 534, and the dynamic threshold determination module 536 may be separately embodied as hardware, firmware, software, virtualized hardware, emulated architecture, and/or a combination thereof. For example, the energy contour module 532 may be embodied as a hardware component, while the data refinement module 534 and the dynamic threshold determination module 536 are embodied as virtualized hardware components or as some other combination of hardware, firmware, software, virtualized hardware, emulated architecture, and/or a combination thereof.

The illustrative step analysis module 540, which may be embodied as hardware, firmware, software, virtualized hardware, emulated architecture, and/or a combination thereof as discussed above, is configured to analyze at least the step data 506 to produce one or more determinations regarding the user, such as determining an activity of the user or determining a pace of the user. Further, in the illustrative embodiment, the step analysis module 540 is configured to produce a report of the determination, such as by transmitting the one or more determinations to the server compute device 130 and/or presenting the one or more determinations to the user. To do so, in the illustrative embodiment, the step analysis module 540 includes an activity determination module 542, a pace determination module 544, and a data reporter module 546. In the illustrative embodiment, the activity determination module 542 is configured to determine an activity of the user based on the step data 506. In the illustrative embodiment, the activity determination module 542 is configured to compare the step data 506 and/or the acceleration data 402 and/or energy contour data 504 to one or more predefined signatures indicative of predefined activities, such as walking, jogging, running, sitting, etc. In some embodiments, the activity determination module 542 may be configured to identify an abrupt change in the orientation of the acceleration represented in the acceleration data as a fall.

The pace determination module 544 may be configured to determine an instantaneous pace of the user by counting a number of detected steps over a relatively short period of (e.g., three seconds) and/or determine an average pace of the user over a longer period of time, such as over the course of an exercise session or other time period (e.g., a day, a week, a month, etc.). The data reporter module 546 may be configured to transmit the determination of the activity, the pace, and/or other information associated with the step data 506 to the server compute device 130 and/or present such information to the user, such as in a visual representation through the display 318 or in another format (e.g., an audible report).

It should be appreciated that each of the activity determination module 542, the pace determination module 544, and the data reporter module 546 may be separately embodied as hardware, firmware, software, virtualized hardware, emulated architecture, and/or a combination thereof. For example, the activity determination module 542 may be embodied as a hardware component, while the pace determination module 544 and the data reporter module 546 are embodied as virtualized hardware components or as some other combination of hardware, firmware, software, virtualized hardware, emulated architecture, and/or a combination thereof.

Figure 6:
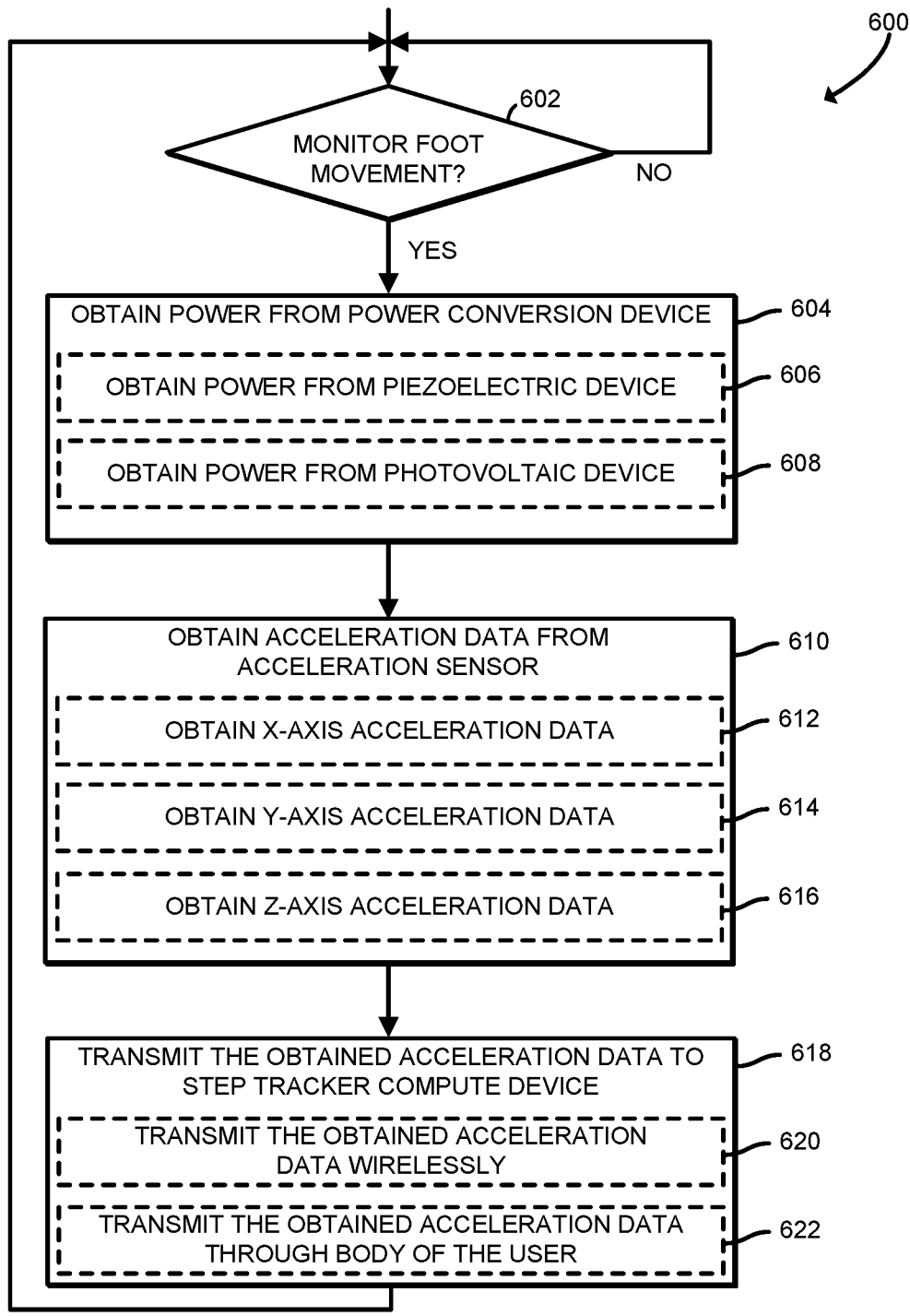
FIG. 6 is a simplified flow diagram of at least one embodiment of a method for monitoring foot movement that may be performed by the footwear compute device of FIGS. 1 and 2.

Referring now to FIG. 6, in use, the footwear compute device 110 may execute a method 600 for monitoring foot movement of the user. The method 600 begins with block 602, in which the footwear compute device 110 determines whether to monitor foot movement of the user. In the illustrative embodiment, the footwear compute device 110 may determine to monitor foot movement upon performing a self assessment and determining that the footwear compute device 110 has been paired with the step tracker compute device 120 and/or that at least one of the power conversion devices 210 is able to provide sufficient power to the footwear compute device 110 to monitor the foot movement. In other embodiments, the footwear compute device 110 determines whether to monitor foot movement of the user based on other criteria. Regardless, in response to a determination to monitor foot movement of the user, the method 600 advances to block 604. Otherwise, the method 600 loops back to block 602 to again determine whether to monitor foot movement of the user. In block 604, the footwear compute device 110 obtains power from one or more of the power conversion devices 210. In doing so, as indicated in block 606, footwear compute device 110 may obtain power from the piezoelectric device 212, such as in response mechanical stress to the piezoelectric device 212 from the user wearing the shoe and impacting the ground. Additionally or alternatively, as indicated in block 608, the footwear compute device 110 may obtain power from the photovoltaic device 214, such as in response to the photovoltaic device 214 receiving light from sunlight or another light source. In other embodiments, the footwear compute device 110 may receive power from a different power conversion device 216.

In block 610, the footwear compute device 110 obtains acceleration data 402 from the acceleration sensor 208. In doing so, as indicated in block 612, the footwear compute device 110 may obtain x-axis acceleration data, representing a positive or negative acceleration along an x-axis over time. Additionally, as indicated in block 614, the footwear compute device 110 may obtain y-axis acceleration data, representing a positive or negative acceleration along a y-axis, which is perpendicular to the x-axis, over time. Further, as indicated in block 616, the footwear compute device 110 may obtain z-axis acceleration data, representing a positive or negative acceleration along a z-axis, which is perpendicular to both the x-axis and the y-axis, over time. In obtaining the acceleration data 402, the footwear compute device 110 may convert signals from the acceleration sensor 208 from one format to another format, such as from an analog value (e.g., a voltage level) to a digitally encoded representation of the analog value for each axis.

In block 618, the footwear compute device 110 transmits the obtained acceleration data 402 to the step tracker compute device 120. In doing so, as indicated in block 620, the footwear compute device 110 may transmit the obtained acceleration data 402 wirelessly, using the wireless communication device 220. Alternatively, as indicated in block 622, the footwear compute device 110 may transmit the obtained acceleration data 402 through the body of the user using body coupled communication (i.e., using the body conductance communication device 222). In other embodiments, the footwear compute device 110 may transmit the obtained acceleration data to the step tracker compute device 120 using another type of communication device 224. After transmitting the acceleration data to the step tracker compute device 120, the method 600 loops back to block 602 in which the footwear compute device 110 determines whether to continue to monitor foot movement of the user.

Figure 7:
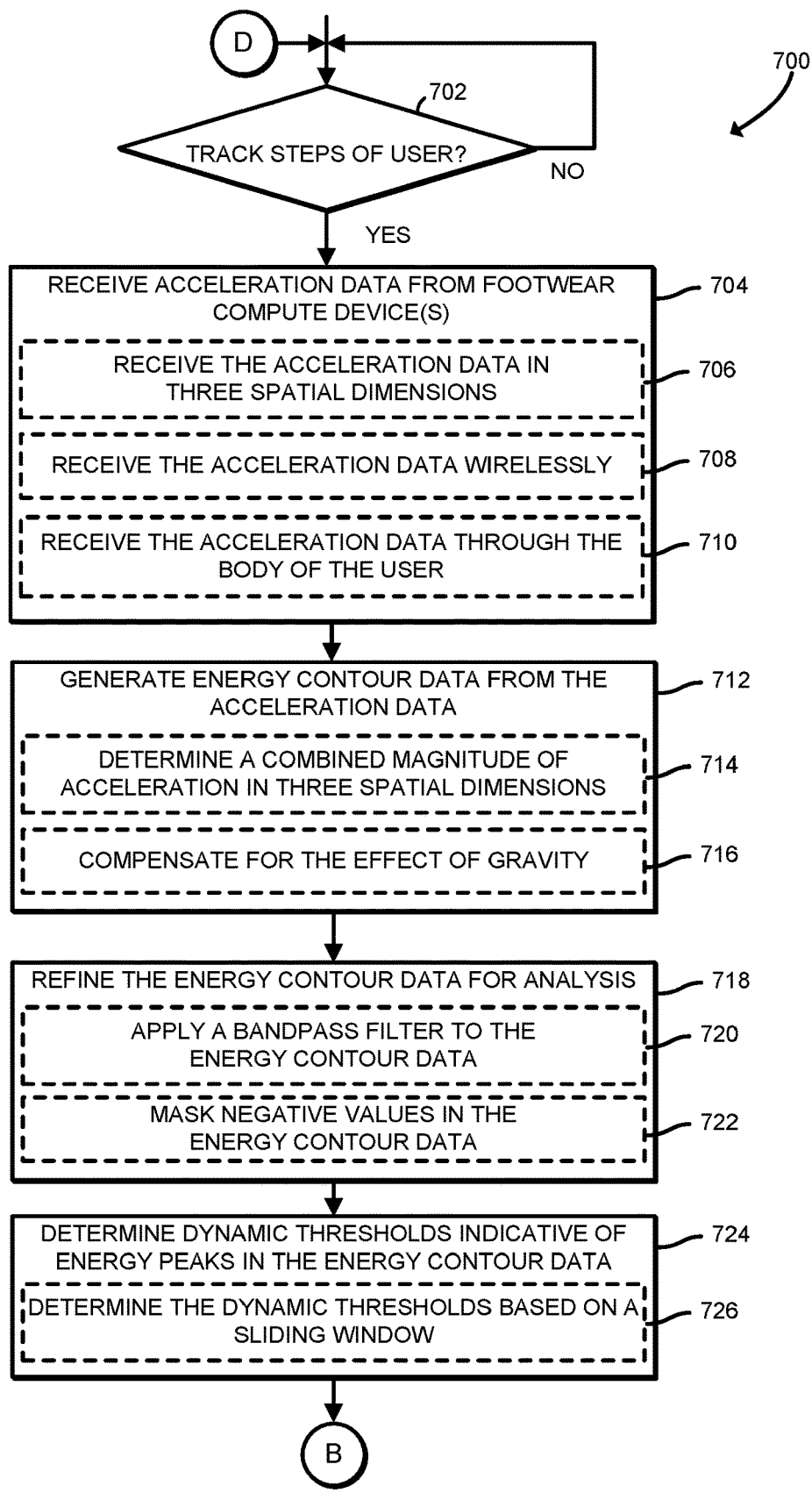
FIGS. 7-9 are a simplified flow diagram of at least one embodiment of a method for tracking steps of a user that may be performed by the step tracker compute device of FIGS. 1 and 3.

Referring now to FIG. 7, in use, the step tracker compute device 120 may execute a method 700 for tracking steps of the user. In block 702, the step tracker compute device 120 determines whether to track steps of the user. In doing so, the step tracker compute device 120 may receive a request from the user through a graphical user interface to proceed with tracking steps of the user or may receive the request from another source, such as from the one or more footwear compute devices 110 (e.g., footwear compute devices 112 and 114). In other embodiments, the step tracker compute device 120 may determine to track steps of the user based on other criteria. Regardless, if the step tracker compute device 120 determines to track steps of the user, the method advances to block 704. Otherwise, the method loops back to block 702 to again determine whether to track steps of the user. In block 704, the step tracker compute device 120 receives the acceleration data 402 from the one or more footwear compute devices 110. In the illustrative embodiment, as indicated in block 706, the step tracker compute device 120, receives the acceleration data 402 in three spatial dimensions (i.e., the x-axis, the y-axis, and the z-axis). As indicated in block 708, the step tracker compute device 120 may receive the acceleration data 402 wirelessly, such as by using the wireless communication device 310. Alternatively, as indicated in block 710, the step tracker compute device 120 may receive the acceleration data 402 through the body of the user, using body coupled communication (i.e., using the body conductance communication device 312).

In block 712, the step tracker compute device 120 generates the energy contour data 504 from the acceleration data 402. In doing so, as indicated in block 714, the step tracker compute device 120 may determine a combined magnitude of the acceleration in the three spatial dimensions (i.e., x-axis, y-axis, and z-axis) for each instant in time for which the acceleration data includes an acceleration measurement. As indicated in block 716, the step tracker compute device 120 may compensate for the effect of gravity, such as by subtracting the acceleration of gravity from the acceleration data associated with the pertinent axis (i.e., the z-axis). Accordingly, in the illustrative embodiment, the step tracker compute device 120 may determine each data point in the energy contour data 504 based on Equation 1, shown below:

$$\text{Energy}(x_i) = a_x(x_i)^2 + a_y(x_i)^2 + (a_z(x_i) - g)^2 \qquad \text{(Equation 1)}$$

In Equation 1, $x_i$ represents the index of the present data point in the data set, $a_x$ represents the acceleration data set for the x-axis, $a_y$ represents the acceleration data set for the y-axis, $a_z$ represents the acceleration data set for the z-axis, and g represents the acceleration of gravity (i.e., 9.8 m/s²).

In block 718, the step tracker compute device 120 refines the energy contour data for further analysis. In doing so, as indicated in block 720, the step tracker compute device 120 may apply a bandpass filter to the energy contour data 504. In the illustrative embodiment, the bandpass filter excludes frequencies that fall outside of a predefined range of frequencies that are associated with a human traveling by foot (e.g., 0.5 Hz to 2 Hz). In other embodiments, the step tracker compute device 120 may apply a different type of filter to exclude one or more different frequencies or frequency ranges from the energy contour data 504. In the illustrative embodiment, as indicated in block 722, the step tracker compute device 120 masks any negative values present in the energy contour data 504. To so, the step tracker compute device may identify negative values in the energy contour data 504 and set those values to zero.

In block 724, the step tracker compute device 120 determines dynamic thresholds that are indicative of energy peaks in the energy contour data 504. In doing so, as indicated in block 726, the step tracker compute device 120 may determine the dynamic thresholds based on a sliding window analysis. In the illustrative embodiment, the dynamic threshold t is calculated dynamically from a sliding window of size w, from the energy contour data 504, represented as $M(x_i)$ in the following equations.

$$t = \mu + c\sigma, \; X \in R_0^+ \qquad \text{(Equation 2)}$$

In Equation 3, shown below, μ represents the mean of $M(x_i)$ across the window length, w.

$$\mu = \frac{\sum_{i=\alpha}^{\beta} M(x_i)}{w} \qquad \text{(Equation 3)}$$

In Equation 4, provided below, σ represents the standard deviation of $M(x_i)$ across the window length, w.

$$\sigma = \sqrt{\frac{\sum_{i=\alpha}^{\beta} x_i - \mu}{w}} \qquad \text{(Equation 4)}$$

The window length, w, is provided by Equation 5, shown below.

$$w = \alpha + \beta + 1 \qquad \text{(Equation 5)}$$

The window range, W, is provided by Equation 6, as follows:

$$W = [x_{i-\alpha}, x_{i+\beta}] \qquad \text{(Equation 6)}$$

In the above equations, c is a parameter evaluated experimentally and, in the illustrative embodiment, is set to 1.5 so that the threshold level remains just below the energy peak. Parameters α and β represent a lower limit on a distance (e.g., a minimum distance) between consecutive energy peaks. In the illustrative embodiment, both α and β are set to 5, which corresponds to an upper limit (e.g., a maximum) peak repetition every 0.5 seconds for a sampling rate of 10 Hz.

Figure 8:
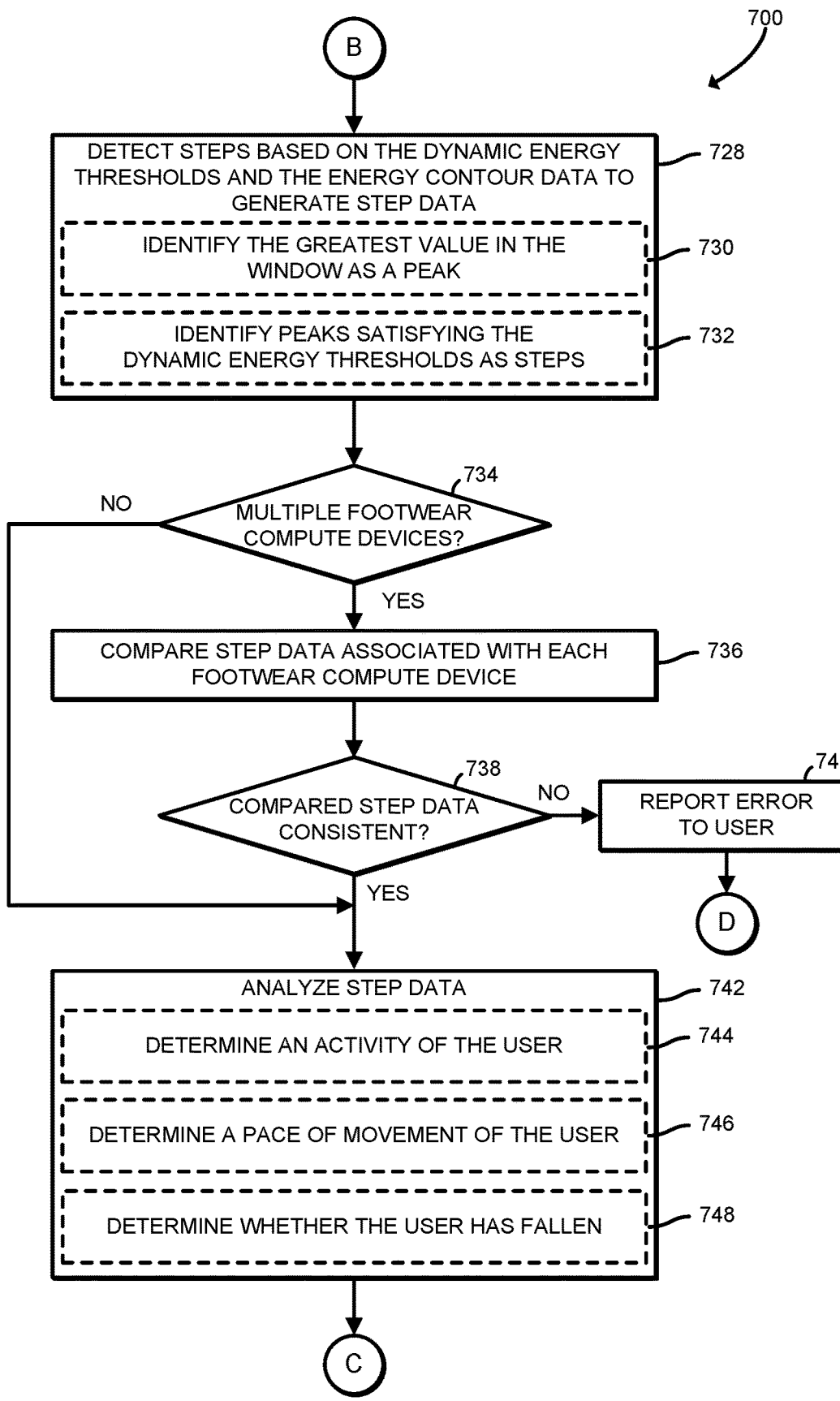

After determining the dynamic thresholds, the method advances to block 728, shown in FIG. 8. In block 728, the step tracker compute device 120 detects steps based on the dynamic energy thresholds and the energy contour data 504 to generate the step data 506. In the illustrative embodiment, the step tracker compute device 120 is configured to detect a signal instance $x_j$ as a footstep if the presently analyzed data point (e.g., $M(x_j)$) of the energy contour data 504 is the greatest data point in the window, as indicated in block 730, and if the presently analyzed data point exceeds the threshold t, as indicated in block 732. This analysis is shown as Equation 7, below.

$$\text{step}(x_j) = \begin{cases} \text{yes}, & \max\{M(x_{j-\alpha}), \ldots, M(x_{j+\beta})\} = x_j \text{ and } M(x_j) > t \\ \text{no}, & \text{otherwise} \end{cases} \qquad \text{(Equation 7)}$$

By determining the dynamic thresholds as described above, the step tracker compute device 120 is able to detect peaks, and thus the user's steps, in the energy contour data 504 even though the energy associated with one peak at one point in time is different than the energy associated with another peak at a different point in time. In other words, the dynamic threshold calculation enables the step tracker compute device 120 to detect footsteps even as the user's stride and pace change, and without requiring the user to perform a separate calibration process.

In block 734, the step tracker compute device 120 makes a determination of the subsequent actions to take based on whether it performed the above analysis on acceleration data 402 from multiple footwear compute devices 110 (e.g., footwear compute devices 112, 114) or just a single footwear compute device 110 (e.g., footwear compute device 112). If the step tracker compute device 120 generated step data 506 from acceleration data 402 from multiple footwear compute devices 110, the method 700 advances to block 736 in which the step tracker compute device 120 compares the step data 506 associated with each footwear compute device 110 to determine whether the number of steps in the step data 506 for one footwear compute device 110 is consistent with the number of steps in the step data 506 for the other footwear compute device 110. In the illustrative embodiment, the step tracker compute device 120 determines whether the numbers of steps indicated in each set of step data 506 is within a predefined number of steps (e.g., one step) of each other. If the compared step data 506 is not consistent, the step tracker compute device 120 reports an error to the user, such as through the display 318. Subsequently, the method 700 loops back to block 702 of FIG. 7 in which the step tracker compute device 120 again determines whether to track steps of the user.

Referring back to block 734, if the step tracker compute device 120 determines that it analyzed acceleration data 402 from only a single footwear compute device 110, or if the step tracker compute device 120 determines, in block 738, that the step data 506 is consistent, the method advances to block 742. In block 742, the step tracker compute device 120 performs an analysis on the step data 506. As indicated in block 744, the step tracker compute device 120 may determine an activity of the user based at least on the step data 506. In the illustrative embodiment, the step tracker compute device 120 may compare the step data 506 with one or more predefined signatures of step data that are associated with defined activities (e.g., running, jogging, walking, climbing, sitting, etc.) and determine whether the step data 506 matches any of the predefined signatures. If so, the step tracker compute device 120 may determine that the user is performing the activity associated with the matching signature.

As indicated in block 746, the step tracker compute device 120 may determine a pace of movement of the user. In the illustrative embodiment, the step tracker compute device 120 does so by determining the number of steps that have occurred over a predefined time period, as indicated in the step data 506. As indicated in block 748, the step tracker compute device 120 may determine whether the user has fallen. In the illustrative embodiment, the step tracker compute device 120 may determine that the user has fallen if the step data 506 indicates an abrupt stop in the pace. The step tracker compute device 120 may additionally analyze the acceleration data 402 to determine whether the acceleration sensor detected a rotation of about 90 degrees, as such an occurrence may be a further indication that the user has fallen.

Figure 9:
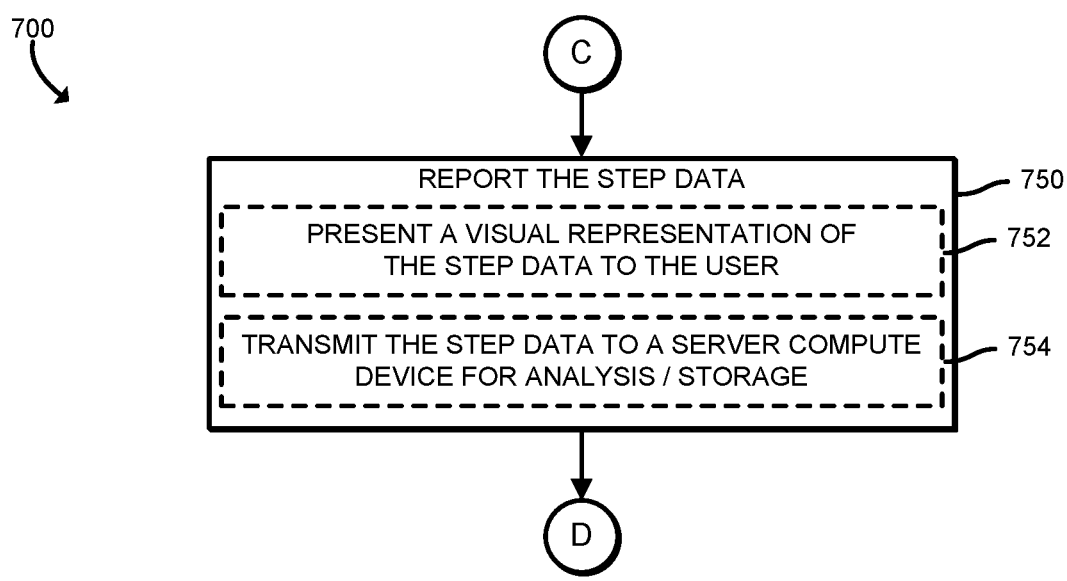

After analyzing the step data 506, the method 700 advances to block 750 of FIG. 9, in which the step tracker compute device 120 reports the step data 506. In doing so, the step tracker compute device 120 may also transmit the results of the analysis of the step data 506 (e.g., the determined activity, the user's pace, the determination that the user has fallen, etc.). The step tracker compute device 120 may present the step data 506 to the user. In the illustrative embodiment, as indicated in block 752, the step tracker compute device 752 presents a visual representation of the step data to the user, such as in a graphical user interface presented on the display 318. Additionally or alternatively, the step tracker compute device 120 may present the information to the user audibly, or through any other output method. As indicated in block 754, the step tracker compute device 120 may transmit the step data to the server compute device 130 for analysis (e.g., statistical analysis, goal tracking, etc.) and/or storage. In the event that the step tracker compute device 120 has determined that the user has fallen, the step tracker compute device 120 may transmit this determination to the server compute device 130 which may, in turn, notify emergency personnel to assist the user.

Figure 10:
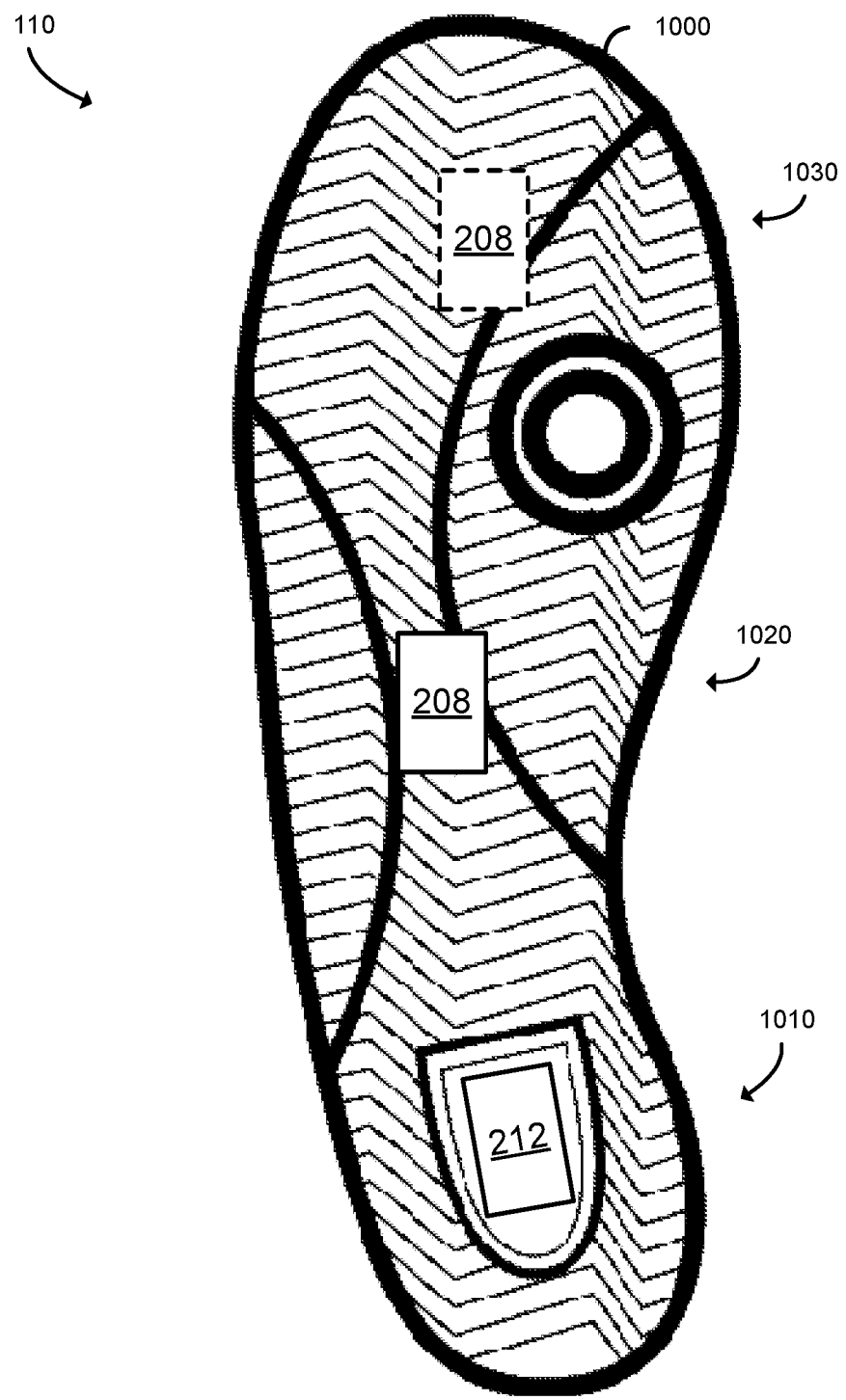
FIG. 10 is a simplified diagram of at least one embodiment of a shoe that includes the footwear compute device of FIGS. 1 and 2.

Referring now to FIG. 10, an article of footwear 1000, which, in the illustrative embodiment is a shoe, includes the footwear compute device 110. Components of the footwear compute device 110 may be distributed across various portions of the footwear 1000. In the illustrative embodiment, the piezoelectric device 212 is located in a heel portion 1010 of the sole of the footwear 1000. By locating the piezoelectric device 212 in the heel portion 1010, the piezoelectric device 212 may experience more mechanical stress when the user is walking, jogging, or running, than if the piezoelectric device 212 was located in another portion of the sole. Accordingly, the placement of the piezoelectric device 212 may result in more electrical power generation as compared to other possible locations for the piezoelectric device 212. Nevertheless, in other embodiments, the piezoelectric device 212 may be located in another portion of the footwear 1000. In the illustrative embodiment, the acceleration sensor 208 is located in a middle portion 1020 of the sole of the footwear 1000, as this location provides acceleration data that is more representative of the movement of the footwear 1000 as a whole, as compared to other locations within the footwear 1000. However, in other embodiments, the acceleration sensor 208 may be located in another portion of the footwear, such as near a toe portion 1030, as indicated in FIG. 10.

Figure 11:
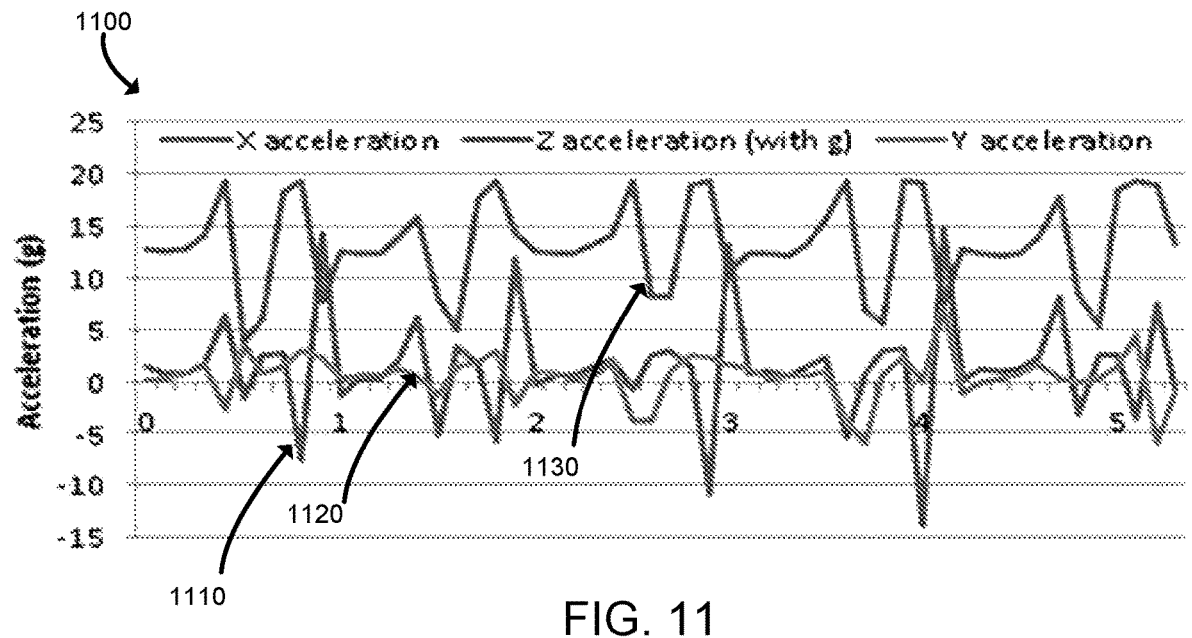
FIG. 11 is a plot of acceleration data over time that may be analyzed by the step tracker compute device of FIGS. 1 and 3.
Figure 12:
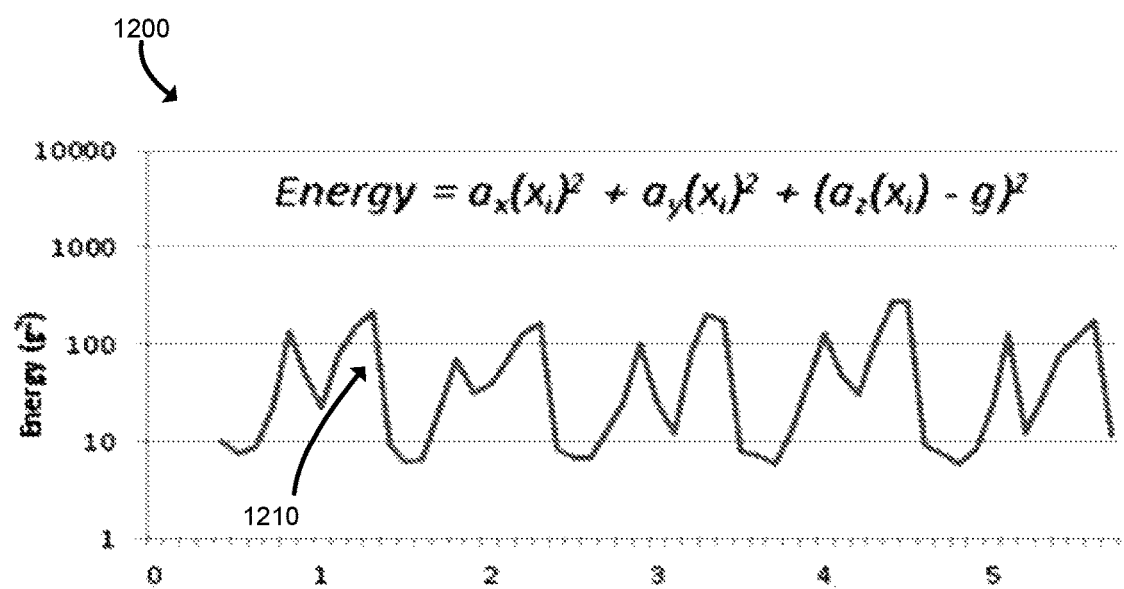
FIG. 12 is a plot of at least one embodiment of energy contour data over time that may be analyzed by the step tracker compute device of FIGS. 1 and 3.
Figure 13:
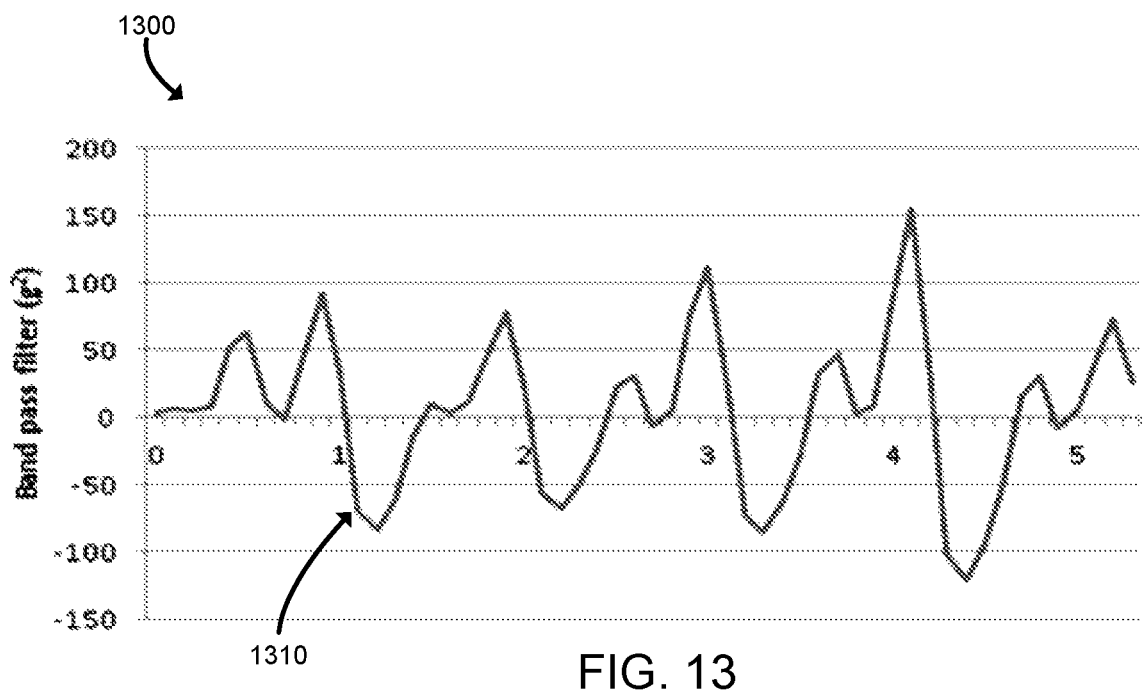
FIG. 13 is a plot of at least one embodiment of the energy contour data over time after a band pass filter has been applied by the step tracker compute device of FIGS. 1 and 3.
Figure 14:
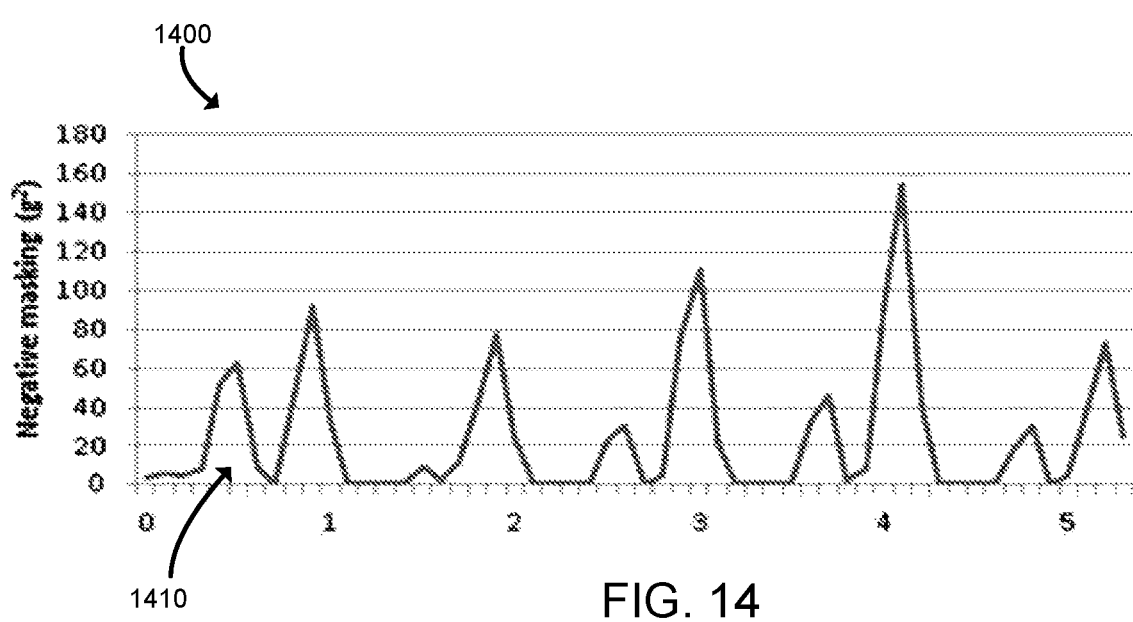
FIG. 14 is a plot of at least one embodiment of the energy contour data over time after negative masking has been applied by the step tracker compute device of FIGS. 1 and 3.
Figure 15:
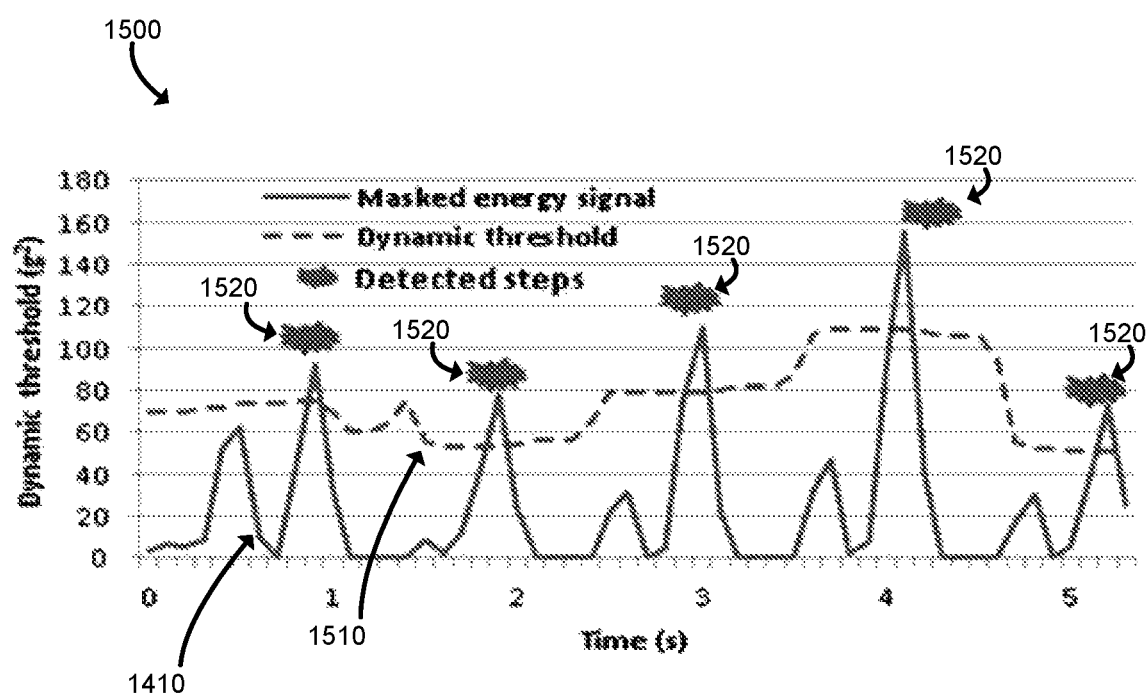
FIG. 15 is a plot of at least one embodiment of the energy contour data after the band pass filter and negative masking have been applied and the step tracker compute device of FIGS. 1 and 3 has determined dynamic energy thresholds to detect steps.

Referring now to FIG. 11, a plot 1100 of the acceleration data 402 over time includes x-axis acceleration data 1110, y-axis acceleration data 1120, and z-axis acceleration data 1130. As described above, in the illustrative embodiment, the footwear compute device 110 is configured to transmit the acceleration data 402 to the step tracker compute device 120 for use in detecting the user's steps. Referring now to FIG. 12, a plot 1200 of the energy contour data 504, which may be produced and analyzed by the step tracker compute device 120, combines the acceleration data for the multiple spatial dimensions (e.g., x-axis, y-axis, and z-axis) into a set of one dimensional energy values 1210 that vary over time. Referring now to FIG. 13, a plot 1300 includes the energy contour data 1310 over time after the step tracker compute device 120 has applied a bandpass filter that excludes frequencies below 0.5 Hz and above 2.0 Hz. Once the bandpass filter has been applied, the energy contour data may contain negative values. Referring now to FIG. 14, a plot 1400 includes the energy contour data 1410 over time after the step tracker compute device 120 has masked the negative values present in the energy contour data 1310 of FIG. 13. In the illustrative embodiment, the step tracker compute device 120 is configured to mask the negative values by setting them to zero, as described above. Referring now to FIG. 15, a plot 1500 includes the energy contour data 1410 after the bandpass filter and negative masking have been applied. The plot 1500 additionally includes the dynamic thresholds 1510 as well as steps 1520 detected by the step tracker compute device 120 at points where the energy contour data exceeds the dynamic thresholds 1510. As shown, the dynamic thresholds 1510 change over time, selectively increasing or decreasing, in response to changes in the user's stride. As described above, by producing the dynamic thresholds, the step tracker compute device 120 is able to detect steps of the user as the user changes his or her stride, without requiring the user to perform a separate calibration or recalibration process with the step tracker compute device 120.

EXAMPLES

Illustrative examples of the technologies disclosed herein are provided below. An embodiment of the technologies may include any one or more, and any combination of, the examples described below.

Example 1 includes a step tracker compute device for tracking steps of a user, comprising a data communication module to receive acceleration data indicative of movement of a foot of the user; and a step detector module to (i) generate, based on the received acceleration data, energy contour data indicative of energy levels over time, (ii) determine dynamic energy thresholds indicative of peaks in the energy contour data, and (iii) detect steps of the user based on the dynamic energy thresholds and the energy contour data to generate step data.

Example 2 includes the subject matter of Example 1, and wherein the step detector module is further to apply a bandpass filter to the energy contour data before the determination of the dynamic energy threshold.

Example 3 includes the subject matter of any of Examples 1 and 2, and wherein to apply a bandpass filter comprises to apply a bandpass filter that excludes frequencies less than 0.5 Hz and frequencies greater than 2 Hz.

Example 4 includes the subject matter of any of Examples 1-3, and wherein the step detector module is further to mask negative values in the filtered energy contour data.

Example 5 includes the subject matter of any of Examples 1-4, and wherein to determine a dynamic energy threshold comprises to determine a first energy threshold value associated with a first window of energy contour data associated with a first time period; and determine a second energy threshold value associated with a second window of energy contour data associated with a second time period.

Example 6 includes the subject matter of any of Examples 1-5, and wherein to generate the energy contour data comprises to determine a combined magnitude of acceleration in three spatial dimensions.

Example 7 includes the subject matter of any of Examples 1-6, and wherein the step detector module is further to compensate for an effect of gravity in the acceleration data.

Example 8 includes the subject matter of any of Examples 1-7, and wherein to receive the acceleration data comprises to receive the acceleration data transmitted from a footwear compute device through a body of the user.

Example 9 includes the subject matter of any of Examples 1-8, and wherein to receive the acceleration data comprises to receive the acceleration data transmitted wirelessly from a footwear compute device located in footwear worn by the user.

Example 10 includes the subject matter of any of Examples 1-9, and further including a step analysis module to analyze the step data to determine an activity of the user.

Example 11 includes the subject matter of any of Examples 1-10, and further including a step analysis module to analyze the step data to determine a pace of movement of the user.

Example 12 includes the subject matter of any of Examples 1-11, and further including a step analysis module to present a visual representation of the step data to the user.

Example 13 includes the subject matter of any of Examples 1-12, and wherein the data communication module is further to transmit the step data to a server compute device for analysis.

Example 14 includes the subject matter of any of Examples 1-13, and wherein the acceleration data is a first set of acceleration data associated with movement of one foot of the user over a time period, the data communication module is further to receive a second set of acceleration data associated with movement of the other foot of the user over the time period, and the step detector module is further to generate the step data based on the first set of acceleration data and the second set of acceleration data.

Example 15 includes the subject matter of any of Examples 1-14, and wherein the step analysis module is further to determine, based on the acceleration data, whether the user has fallen.

Example 16 includes a method for tracking steps of a user, comprising receiving, by a step tracker compute device, acceleration data indicative of movement of a foot of the user; generating, by the step tracker compute device and based on the received acceleration data, energy contour data indicative of energy levels over time; determining, by the step tracker compute device, dynamic energy thresholds indicative of peaks in the energy contour data; and detecting, by the step tracker compute device, steps of the user based on the dynamic energy thresholds and the energy contour data to generate step data.

Example 17 includes the subject matter of Example 16, and further including applying, by the step tracker compute device, a bandpass filter to the energy contour data before the determination of the dynamic energy threshold.

Example 18 includes the subject matter of any of Examples 16 and 17, and wherein applying a bandpass filter comprises applying a bandpass filter that excludes frequencies less than 0.5 Hz and frequencies greater than 2 Hz.

Example 19 includes the subject matter of any of Examples 16-18, and further including masking, by the step tracker compute device, negative values in the filtered energy contour data.

Example 20 includes the subject matter of any of Examples 16-19, and wherein determining a dynamic energy threshold comprises determining a first energy threshold value associated with a first window of energy contour data associated with a first time period; and determining a second energy threshold value associated with a second window of energy contour data associated with a second time period.

Example 21 includes the subject matter of any of Examples 16-20, and wherein generating the energy contour data comprises determining a combined magnitude of acceleration in three spatial dimensions.

Example 22 includes the subject matter of any of Examples 16-21, and further including compensating for an effect of gravity in the acceleration data.

Example 23 includes the subject matter of any of Examples 16-22, and wherein receiving the acceleration data comprises receiving the acceleration data transmitted from a footwear compute device through a body of the user.

Example 24 includes the subject matter of any of Examples 16-23, and wherein receiving the acceleration data comprises receiving the acceleration data transmitted wirelessly from a footwear compute device located in footwear worn by the user.

Example 25 includes the subject matter of any of Examples 16-24, and further including analyzing, by the step tracker compute device, the step data to determine an activity of the user.

Example 26 includes the subject matter of any of Examples 16-25, and further including analyzing, by the step tracker compute device, the step data to determine a pace of movement of the user.

Example 27 includes the subject matter of any of Examples 16-26, and further including presenting, by the step tracker compute device, a visual representation of the step data to the user.

Example 28 includes the subject matter of any of Examples 16-27, and further including transmitting, by the step tracker compute device, the step data to a server compute device for analysis.

Example 29 includes the subject matter of any of Examples 16-28, and wherein the acceleration data is a first set of acceleration data associated with movement of one foot of the user over a time period, the method further comprising receiving, by the step tracker compute device, a second set of acceleration data associated with movement of the other foot of the user over the time period; and generating, by the step tracker compute device, the step data based on the first set of acceleration data and the second set of acceleration data.

Example 30 includes the subject matter of any of Examples 16-29, and further including determining, by the step tracker compute device and based on the acceleration data, whether the user has fallen.

Example 31 includes one or more computer-readable storage media comprising a plurality of instructions that, when executed, cause a compute device to perform the method of any of Examples 16-30.

Example 32 includes a step tracker compute device comprising means for receiving acceleration data indicative of movement of a foot of the user; means for generating, based on the received acceleration data, energy contour data indicative of energy levels over time; means for determining dynamic energy thresholds indicative of peaks in the energy contour data; and means for detecting steps of the user based on the dynamic energy thresholds and the energy contour data to generate step data.

Example 33 includes the subject matter of Example 32, and further including means for applying a bandpass filter to the energy contour data before the determination of the dynamic energy threshold.

Example 34 includes the subject matter of any of Examples 32 and 33, and wherein the means for applying a bandpass filter comprises means for applying a bandpass filter that excludes frequencies less than 0.5 Hz and frequencies greater than 2 Hz.

Example 35 includes the subject matter of any of Examples 32-34, and further including means for masking negative values in the filtered energy contour data.

Example 36 includes the subject matter of any of Examples 32-35, and wherein the means for determining a dynamic energy threshold comprises means for determining a first energy threshold value associated with a first window of energy contour data associated with a first time period; and means for determining a second energy threshold value associated with a second window of energy contour data associated with a second time period.

Example 37 includes the subject matter of any of Examples 32-36, and wherein the means for generating the energy contour data comprises means for determining a combined magnitude of acceleration in three spatial dimensions.

Example 38 includes the subject matter of any of Examples 32-37, and further including means for compensating for an effect of gravity in the acceleration data.

Example 39 includes the subject matter of any of Examples 32-38, and wherein the means for receiving the acceleration data comprises means for receiving the acceleration data transmitted from a footwear compute device through a body of the user.

Example 40 includes the subject matter of any of Examples 32-39, and wherein the means for receiving the acceleration data comprises means for receiving the acceleration data transmitted wirelessly from a footwear compute device located in footwear worn by the user.

Example 41 includes the subject matter of any of Examples 32-40, and further including means for analyzing the step data to determine an activity of the user.

Example 42 includes the subject matter of any of Examples 32-41, and further including means for analyzing the step data to determine a pace of movement of the user.

Example 43 includes the subject matter of any of Examples 32-42, and further including means for presenting a visual representation of the step data to the user.

Example 44 includes the subject matter of any of Examples 32-43, and further including means for transmitting the step data to a server compute device for analysis.

Example 45 includes the subject matter of any of Examples 32-44, and wherein the acceleration data is a first set of acceleration data associated with movement of one foot of the user over a time period, the step tracker compute device further comprising means for receiving a second set of acceleration data associated with movement of the other foot of the user over the time period; and means for generating the step data based on the first set of acceleration data and the second set of acceleration data.

Example 46 includes the subject matter of any of Examples 32-45, and further including means for determining, based on the acceleration data, whether the user has fallen.

Example 47 includes a footwear compute device for generating foot movement data of a user, comprising a three dimensional acceleration sensor to generate acceleration data in three dimensions; a power conversion device to receive power in a first form and convert the power to a second form to provide power to the footwear compute device; and a data communication circuit to transmit the acceleration data to a step tracker compute device.

Example 48 includes the subject matter of Example 47, and wherein at least a portion of the footwear compute device is incorporated into a shoe.

Example 49 includes the subject matter of any of Examples 47 and 48, and wherein the acceleration sensor is incorporated into a middle portion of the shoe.

Example 50 includes the subject matter of any of Examples 47-49, and wherein the power conversion device is incorporated into a heel portion of the shoe.

Example 51 includes the subject matter of any of Examples 47-50, and wherein the data communication circuit is to transmit the acceleration data through the body of the user to the step tracker compute device.

Example 52 includes the subject matter of any of Examples 47-51, and wherein to transmit the acceleration data through the body of the user comprises to transmit the acceleration data using body coupled communication.

Example 53 includes the subject matter of any of Examples 47-52, and wherein the data communication circuit is to transmit the acceleration data to the step tracker compute device wirelessly.

Example 54 includes the subject matter of any of Examples 47-53, and wherein the power conversion device is a piezoelectric transducer.

Example 55 includes the subject matter of any of Examples 47-54, and wherein the power conversion device is a photovoltaic device.

Example 56 includes the subject matter of any of Examples 47-55, and further including an acceleration data management module to receive the acceleration data from the three dimensional sensor.

Example 57 includes the subject matter of any of Examples 47-56, and further including a power management module to receive power from the power conversion device in the second form and provide the power to the footwear compute device.

Example 58 includes a method for generating foot movement data of a user, comprising generating, by a three dimensional acceleration sensor of a footwear compute device, acceleration data in three dimensions; receiving, by a power conversion device of the footwear compute device, power in a first form and converting the power to a second form to provide power to the footwear compute device; and transmitting, by a data communication circuit of the footwear compute device, the acceleration data to a step tracker compute device.

Example 59 includes the subject matter of Example 58, and wherein transmitting the acceleration data comprises transmitting the acceleration data through the body of the user to the step tracker compute device.

Example 60 includes the subject matter of any of Examples 58 and 59, and wherein transmitting the acceleration data through the body of the user comprises transmitting the acceleration data using body coupled communication.

Example 61 includes the subject matter of any of Examples 58-60, and wherein transmitting the acceleration data comprises transmitting the acceleration data to the step tracker compute device wirelessly.

Example 62 includes one or more computer-readable storage media comprising a plurality of instructions that, when executed, cause a compute device to perform the method of any of Examples 58-61.

Example 63 includes a footwear compute device comprising means for generating acceleration data in three dimensions; means for receiving power in a first form and converting the power to a second form to provide power to the footwear compute device; and means for transmitting the acceleration data to a step tracker compute device.

Example 64 includes the subject matter of Example 63, and wherein the means for transmitting the acceleration data comprises means for transmitting the acceleration data through the body of the user to the step tracker compute device.

Example 65 includes the subject matter of any of Examples 63 and 64, and wherein the means for transmitting the acceleration data through the body of the user comprises means for transmitting the acceleration data using body coupled communication.

Example 66 includes the subject matter of any of Examples 63-65, and wherein the means for transmitting the acceleration data comprises means for transmitting the acceleration data to the step tracker compute device wirelessly.

The invention claimed is:

1. A step tracker compute device for tracking steps of a user, comprising:
a data communication module to receive acceleration data indicative of movement of a foot of the user; and
a step detector module to (i) generate, based on the received acceleration data, energy contour data determined as a sum of squares of acceleration values in three dimensions over time, (ii) determine dynamic energy thresholds in the energy contour data, wherein to determine the dynamic energy thresholds is to include determining a first energy threshold value as a first function of a first average of the energy contour data within a first predefined window of the energy contour data associated with a first time period in addition to a first standard deviation in the energy contour data within the first predefined window and determining a second energy threshold value as a second function of a second average of the energy contour data within a second predefined window of the energy contour data associated with a second time period in addition to a second standard deviation in the energy contour data within the second predefined window, and (iii) detect, as steps of the user, corresponding peaks in the energy contour data, wherein each peak satisfies a corresponding dynamic energy threshold in the energy contour data.

2. The step tracker compute device of claim 1, wherein the step detector module is further to apply a bandpass filter to the energy contour data before the determination of the dynamic energy thresholds.

3. The step tracker compute device of claim 2, wherein to apply a bandpass filter comprises to apply a bandpass filter that excludes frequencies less than 0.5 Hz and frequencies greater than 2 Hz.

4. The step tracker compute device of claim 2, wherein the step detector module is further to mask negative values in the filtered energy contour data.

5. The step tracker compute device of claim 1, wherein to generate the energy contour data comprises to determine a combined magnitude of acceleration in three spatial dimensions.

6. The step tracker compute device of claim 5, wherein the step detector module is further to compensate for an effect of gravity in the received acceleration data.

7. The step tracker compute device of claim 1, wherein to receive the acceleration data comprises to receive the acceleration data transmitted from a footwear compute device through a body of the user.

8. The step tracker compute device of claim 1, wherein to receive the acceleration data comprises to receive the acceleration data transmitted wirelessly from a footwear compute device located in footwear worn by the user.

9. The step tracker compute device of claim 1, wherein the determining the first energy threshold value is to include adding, to the first average of the energy contour data within the first predefined window, a first value based on the first standard deviation in the energy contour data within the first predefined window, and wherein to determine the second energy threshold value is to include adding, to the second average of the energy contour data within the second predefined window, a second value based on the second standard deviation in the energy contour data within the second predefined window.

10. One or more non-transitory computer-readable storage media comprising a plurality of instructions that, when executed by a step tracker compute device, cause the step tracker compute device to:
receive acceleration data indicative of movement of a foot of a user;
generate, based on the received acceleration data, energy contour data determined as a sum of squares of acceleration values in three dimensions over time;
determine dynamic energy thresholds in the energy contour data, wherein to determine the dynamic energy thresholds is at least to:
determine a first energy threshold value as a first function of a first average of the energy contour data within a first predefined window of the energy contour data associated with a first time period in addition to a first standard deviation in the energy contour data within the first predefined window, and
determine a second energy threshold value as a second function of a second average of the energy contour data within a second predefined window of the energy contour data associated with a second time period in addition to a second standard deviation in the energy contour data within the second predefined window; and
detect, as steps of the user, corresponding peaks in the energy contour data, wherein each peak satisfies a corresponding dynamic energy threshold in the energy contour data.

11. The one or more non-transitory computer-readable storage media of claim 10, wherein the plurality of instructions further cause the step tracker compute device to apply a bandpass filter to the energy contour data before the determination of the dynamic energy thresholds.

12. The one or more non-transitory computer-readable storage media of claim 11, wherein to apply a bandpass filter comprises to apply a bandpass filter that excludes frequencies less than 0.5 Hz and frequencies greater than 2 Hz.

13. The one or more non-transitory computer-readable storage media of claim 11, wherein the plurality of instructions further cause the step tracker compute device to mask negative values in the filtered energy contour data.

14. The one or more non-transitory computer-readable storage media of claim 10, wherein to generate the energy contour data comprises to determine a combined magnitude of acceleration in three spatial dimensions.

15. The one or more non-transitory computer-readable storage media of claim 14, wherein the plurality of instructions further cause the step tracker compute device to compensate for an effect of gravity in the received acceleration data.

16. The one or more non-transitory computer-readable storage media of claim 10, wherein to receive the acceleration data comprises to receive the acceleration data transmitted from a footwear compute device through a body of the user.

17. The one or more non-transitory computer-readable storage media of claim 10, wherein to determine the first energy threshold value is to include adding, to the first average of the energy contour data within the first predefined window, a first value based on the first standard deviation in the energy contour data within the first predefined window, and wherein to determine the second energy threshold value is to include adding, to the second average of the energy contour data within the second predefined window, a second value based on the second standard deviation in the energy contour data within the second predefined window.

18. A method for tracking steps of a user, comprising:
receiving, by a step tracker compute device, acceleration data indicative of movement of a foot of the user;
generating, by the step tracker compute device and based on the received acceleration data, energy contour data determined as a sum of squares of acceleration values in three dimensions over time;
determining, by the step tracker compute device, dynamic energy thresholds in the energy contour data, wherein the determining the dynamic energy thresholds includes:
determining a first energy threshold value as a first function of a first average of the energy contour data within a first predefined window of the energy contour data associated with a first time period in addition to a first standard deviation in the energy contour data within the first predefined window; and
determining a second energy threshold value as a second function of a second average of the energy contour data within a second predefined window of the energy contour data associated with a second time period in addition to a second standard deviation in the energy contour data within the second predefined window and
detecting, by the step tracker compute device, as steps of the user, corresponding peaks in the energy contour data, wherein each peak satisfies a corresponding dynamic energy threshold in the energy contour data.

19. The method of claim 18, further comprising applying, by the step tracker compute device, a bandpass filter to the energy contour data before the determination of the dynamic energy thresholds.

20. The method of claim 19, wherein applying a bandpass filter comprises applying a bandpass filter that excludes frequencies less than 0.5 Hz and frequencies greater than 2 Hz.

21. The method of claim 19, further comprising masking, by the step tracker compute device, negative values in the filtered energy contour data.

22. The method of claim 18, wherein generating the energy contour data comprises determining a combined magnitude of acceleration in three spatial dimensions.

23. The method of claim 22, further comprising compensating for an effect of gravity in the received acceleration data.

24. The method of claim 18, wherein receiving the acceleration data comprises receiving the acceleration data transmitted from a footwear compute device through a body of the user.

25. The method of claim 18, wherein the determining the first energy threshold value includes adding, to the first average of the energy contour data within the first predefined window, a first value based on the first standard deviation in the energy contour data within the first predefined window, and wherein the determining the second energy threshold value includes adding, to the second average of the energy contour data within the second predefined window, a second value based on the second standard deviation in the energy contour data within the second predefined window.

* * * * *